US008649570B2

United States Patent
Abiko

(10) Patent No.: US 8,649,570 B2
(45) Date of Patent: Feb. 11, 2014

(54) BIOMETRIC INFORMATION PROCESSING APPARATUS, BIOMETRIC INFORMATION PROCESSING METHOD, AND BIOMETRIC INFORMATION PROCESSING COMPUTER PROGRAM

(75) Inventor: Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/439,541

(22) Filed: Apr. 4, 2012

(65) Prior Publication Data

US 2012/0195475 A1  Aug. 2, 2012

Related U.S. Application Data

(63) Continuation of application No. PCT/JP2009/067361, filed on Oct. 5, 2009.

(51) Int. Cl.
*G06K 9/00* (2006.01)

(52) U.S. Cl.
USPC ........... 382/115; 382/116; 382/119; 382/124; 382/125; 382/126

(58) Field of Classification Search
USPC ................. 382/115, 116, 119, 124, 125, 126; 902/3; 356/71; 283/68, 69, 70; 704/273
See application file for complete search history.

(56) References Cited

U.S. PATENT DOCUMENTS

| 5,901,239 | A | 5/1999 | Kamei | |
|---|---|---|---|---|
| 7,804,982 | B2 * | 9/2010 | Howard et al. | 382/115 |
| 8,160,877 | B1 * | 4/2012 | Nucci et al. | 704/246 |
| 8,391,590 | B2 * | 3/2013 | Yalla et al. | 382/154 |
| 2001/0040988 | A1 | 11/2001 | Takahashi | |
| 2002/0048390 | A1 | 4/2002 | Ikegami | |
| 2005/0129291 | A1 * | 6/2005 | Boshra | 382/124 |
| 2005/0281439 | A1 * | 12/2005 | Lange | 382/115 |
| 2006/0018523 | A1 | 1/2006 | Saitoh et al. | |

FOREIGN PATENT DOCUMENTS

| JP | 9-44666 | 2/1997 |
|---|---|---|
| JP | 2001-167268 | 6/2001 |
| JP | 2002-133416 | 5/2002 |
| JP | 2003-30629 | 1/2003 |
| JP | 2003-150960 | 5/2003 |

(Continued)

OTHER PUBLICATIONS

International Search Report for PCT/JP2009/067361 mailed Nov. 2, 2009.

(Continued)

*Primary Examiner* — Ali Bayat
(74) *Attorney, Agent, or Firm* — Staas & Halsey LLP

(57) ABSTRACT

A biometric information processing apparatus includes: a biometric information acquiring unit which acquires biometric input data representing a user's biometric input information; and a processing unit. The processing unit executes: extracting a feature quantity characterizing a feature of the biometric information from the biometric input information; classifying, based on the extracted feature quantity, the biometric input information into at least one of a plurality of classes categorized according to common features of biometric information; computing a confidence level for each class into which the biometric input information has been classified; judging whether or not a maximum value of the confidence level is larger than a threshold value predefined for the class corresponding to the maximum value among the plurality of classes; and, if the maximum value is not larger than the threshold value, prompting the user to have the user's biometric information reacquired.

8 Claims, 11 Drawing Sheets

(56) References Cited

FOREIGN PATENT DOCUMENTS

| JP | 2003-256815 | 9/2003 |
|----|-------------|--------|
| JP | 2006-39777  | 2/2006 |
| JP | 2007-219731 | 8/2007 |

OTHER PUBLICATIONS

Office Action issued Sep. 3, 2013 in corresponding Japanese Application No. 2011-535226.

* cited by examiner

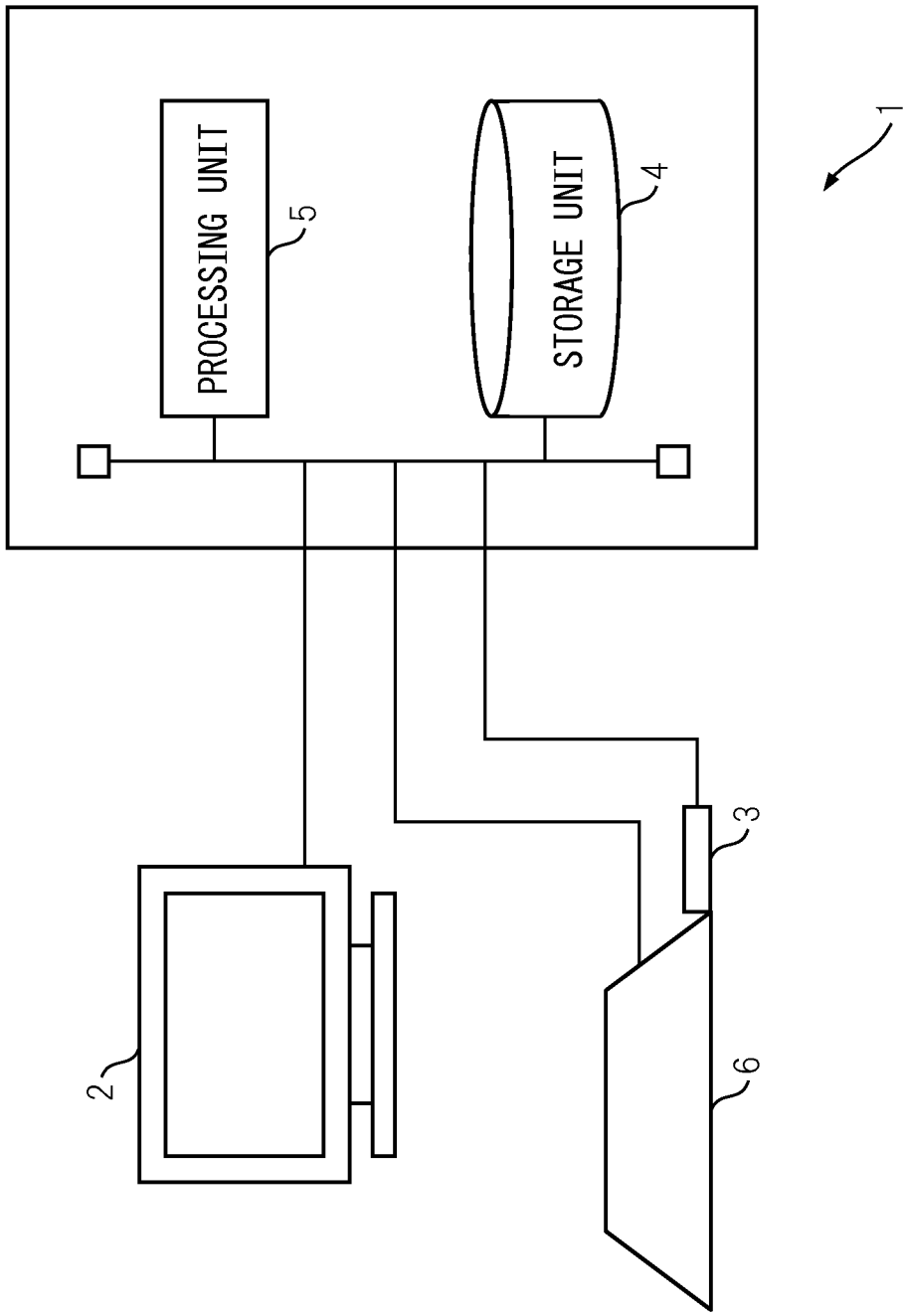

WHORL 200

LEFT LOOP 210

RIGHT LOOP 220

ARCH 230

TENTED ARCH 240

FIG.4A  FIG.4B  FIG.4C
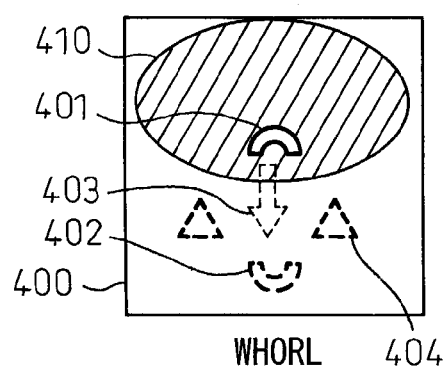 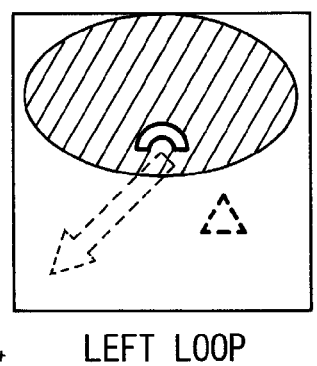 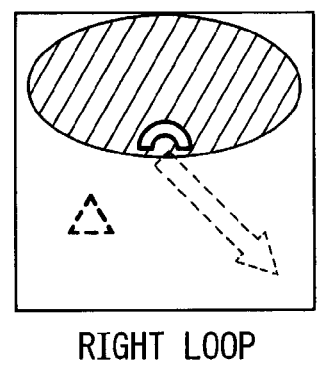
WHORL   LEFT LOOP   RIGHT LOOP
FIG.4D  FIG.4E
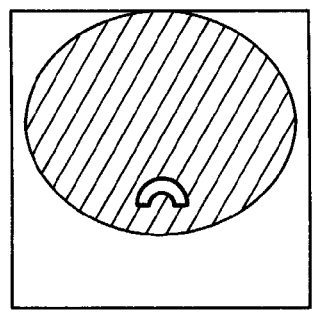 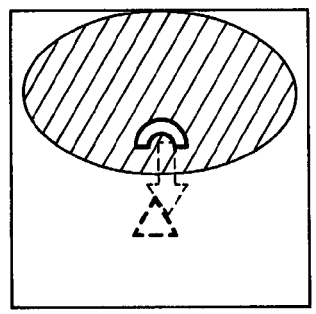
ARCH   TENTED ARCH

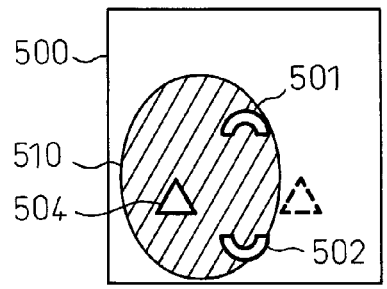
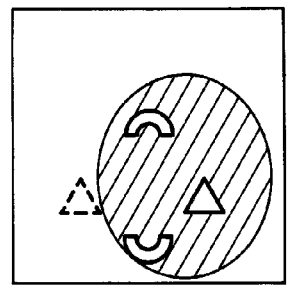
FIG.5A  FIG.5B
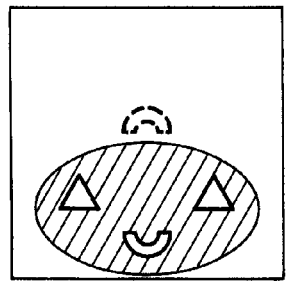
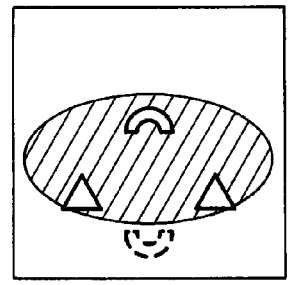
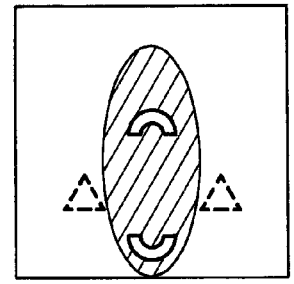
FIG.5C  FIG.5D  FIG.5E
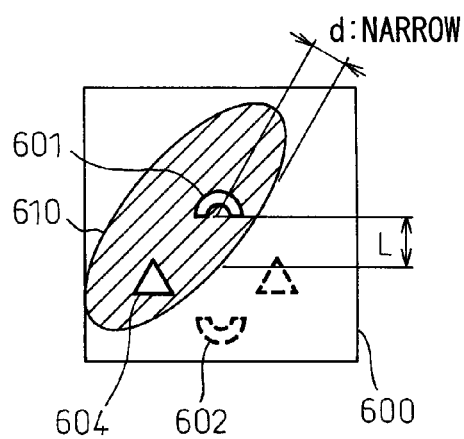
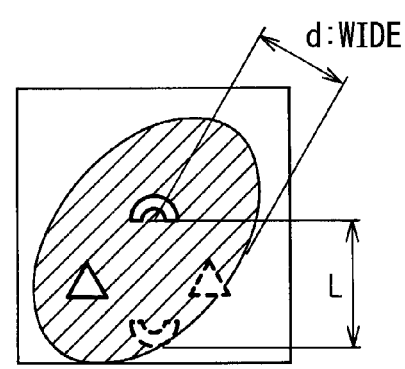
FIG.6A  FIG.6B

FIG.7

NUMBER OF SINGULAR POINTS

| UPWARD CONVEX CORE | DOWNWARD CONVEX CORE | DELTA | CONFIDENCE LEVEL | CRITERIA | CLASS |
|---|---|---|---|---|---|
| 4 | 1 | 1 | 2 | 100 | – | WHORL |
| 3 | 1 | 1 | 1 | 100 | – | WHORL |
| 3 | 1 | 0 | 2 | 100 | – | WHORL |
| 3 | 0 | 1 | 2 | 100 | – | WHORL |
| 2 | 1 | 1 | 0 | 100 | – | WHORL |
| 2 | 1 | 0 | 1 (RIGHT) | 100 | LEFT-SIDE SPACE IS SUFFICIENTLY LARGE | LEFT LOOP |
|   |   |   |   | 50 | LEFT-SIDE SPACE IS SMALL | LEFT LOOP WHORL |
| 2 | 1 | 0 | 1 (LEFT) | 100 | RIGHT-SIDE SPACE IS SUFFICIENTLY LARGE | RIGHT LOOP |
|   |   |   |   | 50 | RIGHT-SIDE SPACE IS SMALL | RIGHT LOOP WHORL |
| 2 | 1 | 1 | 0 | 100 | – | WHORL |
| 2 | 0 | 0 | 2 | 100 |   | WHORL |
| 1 | 1 | 0 | 0 | 50 | LOWER SPACE IS SUFFICIENTLY LARGE | ARCH |
|   |   |   |   | 20 | LOWER SPACE IS SMALL | ARCH TENTED ARCH RIGHT LOOP LEFT LOOP WHORL |
| 1 | 0 | 1 | 0 | 100 | – | WHORL |
| 1 | 0 | 0 | 1 | 33 | UPPER SPACE IS SUFFICIENTLY LARGE | RIGHT LOOP LEFT LOOP WHORL |
|   |   |   |   | 25 | UPPER SPACE IS SMALL | TENTED ARCH RIGHT LOOP LEFT LOOP WHORL |
| 0 | 0 | 0 | 0 | 0 | – | NONE |

BIOMETRIC INFORMATION PROCESSING APPARATUS, BIOMETRIC INFORMATION PROCESSING METHOD, AND BIOMETRIC INFORMATION PROCESSING COMPUTER PROGRAM

CROSS-REFERENCE TO RELATED APPLICATION

This application is a continuation application and is based upon PCT/JP2009/67361, filed on Oct. 5, 2009, the entire contents of which are incorporated herein by reference.

FIELD

The embodiments disclosed herein are related to a biometric information processing apparatus which utilizes biometric information presented in the form of biometric data for biometric authentication, and are also related to a biometric information processing method and a biometric information processing computer program.

BACKGROUND

Recent years have seen the development of biometric authentication technology for authenticating a user of an apparatus or system based on a biometric image representing the user's biometric information such as a palm or finger vein pattern or a fingerprint or palm print. A biometric authentication device using such biometric authentication technology acquires, as a biometric input image, a biometric image representing, for example, the biometric information of a user who wishes to use the biometric authentication device. Then, the biometric authentication device compares the user's biometric input information represented by the biometric input image with registered biometric information, i.e., the biometric information prestored in the form of a biometric image for each registered user. If it is determined as the result of the comparison that the biometric input information matches the registered biometric information, the biometric authentication device authenticates the user as being a registered user. The biometric authentication device then permits the authenticated user to use the apparatus in which the biometric authentication device is incorporated or some other apparatus connected to the biometric authentication device.

When such a biometric authentication device is used, the user has to wait until the biometric authentication process is completed, before he can use the desired apparatus. Therefore, if the time taken to complete the biometric authentication process is long, the user will be inconvenienced. Especially, in the case of a one-to-N matching scheme in which the biometric input information is compared against a set of a plurality of pieces of registered biometric information each prestored as a registered biometric image in the biometric authentication device, the biometric authentication device has to perform a plurality of comparisons. This inevitably increases the time taken to complete the biometric authentication process.

To address this problem, a technique has been developed that classifies biometric input information into one of a plurality of classes, based on a feature quantity extracted from the biometric input information, and that compares the biometric input information only with the registered biometric information that belongs to the same class as the biometric input information (for example, refer to Japanese Laid-open Patent Publication No. 2002-133416 and Japanese Laid-open Patent Publication No. 2006-39777). By using this technique, the number of comparisons to be performed can be reduced, because the number of pieces of registered biometric information used for comparison decreases. As a result, even when the one-to-N matching scheme is employed, the biometric authentication device can reduce the overall time taken to complete the biometric authentication process. In the known art, when the biometric input information is a fingerprint, a feature, such as ridge spacing, center position of fingerprint, or ridge direction, is used to classify the biometric input information.

In the user of the biometric authentication technology, it is desirable that the characteristic features of the biometric information be captured clearly in the biometric image. However, if the user's body part as the biometric information to be used for matching is not properly positioned relative to the sensor for capturing the biometric information, a portion of the biometric information to be used for matching may not be captured in the biometric image or the biometric information captured may not be clear enough. In such cases, the biometric authentication device may not be able to extract from the biometric input information the feature quantity to be used for classifying the biometric input information, and may thus become unable to accurately classify the biometric input information. If the biometric input information is erroneously classified as belonging to a class different from the class to which it should belong, the biometric authentication device is unable to compare the biometric input information with the registered biometric information of the corresponding user. This results in a degradation of the authentication accuracy.

In view of the above, a technique has been developed that notifies the user to have his biometric information reread by the sensor to re-acquire the biometric image if it is determined that the biometric input information has not been captured correctly (for example, refer to Japanese Laid-open Patent Publication No. 2001-167268 and Japanese Laid-open Patent Publication No. 2003-256815). According to this technique, it is determined whether the image has been captured correctly or not, based on the density distribution of the image representing the biometric input information, or based on whether the desired feature point of the biometric information has been successfully extracted from the image or on the position of the feature point.

SUMMARY

When classifying the biometric input information into one of a plurality of classes according to its feature, the information needed to accurately classify the biometric input information may be different for each class.

However, in the prior art, the biometric authentication device determines whether the image representing the biometric input information has been captured correctly or not, based on the same criteria, regardless of the class to which it belongs. As a result, there have been cases where the biometric authentication device employing the prior art technique determines that the image representing the biometric input information has not been captured correctly, even when the information needed to accurately classify the biometric input information is contained in the biometric input information. In such cases, the user is requested to reenter the biometric information when there is otherwise no need to have the biometric information reread and, as a result, the time taken to complete the biometric authentication process may become unnecessarily long.

According to one embodiment, a biometric information processing apparatus is provided. The biometric information processing apparatus includes: a biometric information acquiring unit which acquires biometric input data representing user's biometric information; and a processing unit. The processing unit implements: a feature quantity extracting function which extracts a feature quantity characterizing a feature of the biometric information from the biometric input information represented by the biometric input data; a classifying function which classifies, based on the extracted feature quantity, the biometric input information represented by the biometric input data into at least one of a plurality of classes categorized according to common features of biometric information, and which computes a confidence level for each class into which the biometric input information has been classified; a classification result judging function which judges whether or not a maximum value of the confidence level is larger than a threshold value predefined for the class corresponding to the maximum value of the confidence level among the plurality of classes; and a guidance function which, if the maximum value of the confidence level is not larger than the threshold value, prompts the user to have the user's biometric information reacquired by the biometric information acquiring unit.

According to another embodiment, a biometric information processing method is provided. The biometric information processing method includes: acquiring biometric input data representing user's biometric information; extracting a feature quantity characterizing a feature of the biometric information from the biometric input information represented by the biometric input data; classifying, based on the extracted feature quantity, the biometric input information represented by the biometric input data into at least one of a plurality of classes categorized according to common features of biometric information, and computing a confidence level for the class into which the biometric input information has been classified; judging whether or not a maximum value of the confidence level is larger than a threshold value predefined for the class corresponding to the maximum value of the confidence level among the plurality of classes; and if the maximum value of the confidence level is not larger than the threshold value, then prompting the user to have the user's biometric information reacquired by the biometric information acquiring unit.

According to still another embodiment, a biometric information processing computer program for causing a computer to perform biometric information processing is provided. The computer program includes instructions for causing the computer to execute: extracting, from a user's biometric information represented by biometric input data acquired by a biometric information acquiring unit, a feature quantity characterizing a feature of the biometric information; classifying, based on the extracted feature quantity, the biometric input information represented by the biometric input data into at least one of a plurality of classes categorized according to common features of biometric information, and computing a confidence level for the class into which the biometric input information has been classified; judging whether or not a maximum value of the confidence level is larger than a threshold value predefined for the class corresponding to the maximum value of the confidence level among the plurality of classes; and if the maximum value of the confidence level is not larger than the threshold value, then prompting the user to have the user's biometric information reacquired by the biometric information acquiring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram schematically illustrating the configuration of a biometric information processing apparatus according to a first embodiment.

FIGS. 4A to 4E are diagrams illustrating the relationship between a singular point detected on a fingerprint and each predefined class for the case where only the upper portion of the fingerprint is captured in an biometric input image.

FIGS. 5A to 5E are diagrams illustrating fingerprints, each belonging to a whorl class and captured in a biometric input image, for the case where one or more of the singular points are located outside the fingerprint region defined on the biometric input image.

FIGS. 6A and 6B are diagrams each illustrating the relationship between the size of the fingerprint region and the confidence level for the class into which biometric input information is classified.

FIG. 7 is a diagram illustrating one example of a reference table illustrating the confidence level for each class versus the feature points extracted from the biometric input information.

DESCRIPTION OF EMBODIMENTS

Figure 2A:
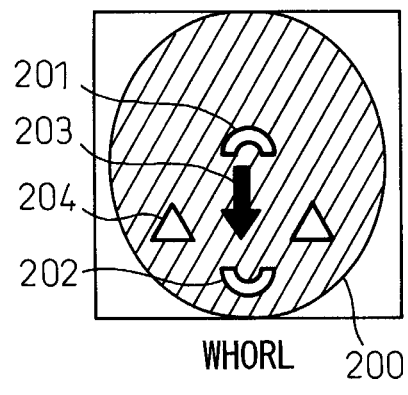
FIGS. 2A to 2E are diagrams illustrating by way of example the relationships between the feature quantities extracted from fingerprints and the fingerprint classes characterized by the feature quantities.

A biometric information processing apparatus which carries out a biometric authentication process according to a first embodiment will be described below with reference to the drawings.

The biometric information processing apparatus, which performs biometric authentication to authenticate a user, acquires biometric input data which is presented as data representing the user's biometric information. Then, based on a feature quantity extracted from the biometric input information, the biometric information processing apparatus classifies the biometric input information, i.e., the user's biometric information represented by the biometric input data, into at least one of a plurality of classes categorized according to the common features of the biometric information. After that, the biometric information processing apparatus compares the biometric input information with the registered biometric information, i.e., the biometric information prestored for each registered user, that belongs to the same class as the biometric input information. If the registered biometric information of any one of the registered users is judged to match the biometric input information, the biometric information processing apparatus authenticates the user as being the registered user whose registered biometric information has been judged to match the biometric input information.

The biometric information processing apparatus, based on the feature quantity extracted from the biometric input information, determines the confidence level that indicates the degree of certainty that the registered biometric information belongs to the same class as the biometric input information. Then, by comparing the confidence level with a threshold value predefined for each class, the biometric information processing apparatus determines whether there is a need to re-acquire the biometric input data.

In the present embodiment, the biometric information processing apparatus uses a fingerprint as the biometric information for biometric authentication. Therefore, the biometric input information and the registered biometric information are each presented in the form of an image. More specifically, a biometric input image is used as the biometric input data representing the biometric input information. Likewise, a registered biometric image is used as the registered biometric data representing the registered biometric information. However, other kinds of biometric information, such as a palm print, a nose print, a vein pattern, a palm shape, a face, an auricle, a retinal pattern, etc., that can be presented in the form of a still image, may be used as the biometric information for biometric authentication. Alternatively, biometric information, such as a voice print or a walking gait, that is acquired continuously over time, may be used as the biometric information for biometric authentication. For example, when the biometric information is a voice print, the biometric input information and the registered biometric information are each represented by a voice signal produced by recording the voice print over a given period of time.

In this specification, the term "matching process" is used to refer to the process for computing the degree of similarity between the biometric input information and the registered biometric information. Further, the term "biometric authentication process" is used to refer not only to the matching process but also to the entire authentication process, including the process for determining whether the user is an authenticated user or not based on the degree of similarity obtained by the matching process.

FIG. 1 is a diagram schematically illustrating the configuration of the biometric information processing apparatus. As illustrated in FIG. 1, the biometric information processing apparatus 1 includes a display unit 2, a biometric information acquiring unit 3, a storage unit 4, and a processing unit 5. The biometric information processing apparatus 1 acquires a biometric input image representing the user's fingerprint, and carries out the biometric authentication process by using the biometric input image. When the user is authenticated as being one of the registered users as a result of the biometric authentication, the biometric information processing apparatus 1 permits the user to use the apparatus equipped with the biometric information processing apparatus 1. Alternatively, the biometric information processing apparatus 1 transmits to another apparatus (not depicted) a signal indicating that the user has been authenticated, and permits the user to use the other apparatus.

The biometric information processing apparatus 1 may further includes an input unit 6, such as a keyboard, a mouse, or a touchpad. Then, the biometric information processing apparatus 1 may acquire a command, data, or user identification information that the user entered via the input unit 6, and may pass the command, data, or user identification information to the processing unit 5. If the user does not need to enter any information other than his biometric information, the input unit 6 may be omitted.

The display unit 2 includes a display device such as a liquid crystal display or a CRT monitor. The display unit 2 displays a guidance message for directing the user to place his finger on the designated position where the biometric information acquiring unit 3 can acquire the biometric input image correctly. The display unit 2 also displays various kinds of information associated with applications executed by the processing unit 5.

The biometric information acquiring unit 3 acquires a biometric input image representing the user's fingerprint. For this purpose, the biometric information acquiring unit 3 includes, for example, a sweep-type fingerprint sensor. This fingerprint sensor may be a sensor that employs, for example, an optical type, a capacitive type, an electric field type, or a heat-sensitive type sensing element. Alternatively, the biometric information acquiring unit 3 may include a fingerprint sensor of any suitable type that uses an area sensor. The biometric information acquiring unit 3 passes the acquired biometric input image to the processing unit 5.

The biometric information acquiring unit 3 may be formed integrally with the display unit 2 or the input unit 6.

The storage unit 4 includes at least one device selected, for example, from among a semiconductor memory device, a magnetic disk device, and an optical disk device. The storage unit 4 stores an application program to be used in the biometric information processing apparatus 1, the identification information and personal setting information of at least one registered user, and various kinds of data. The storage unit 4 further stores a program for carrying out the biometric authentication process. Furthermore, the storage unit 4 stores data concerning the fingerprint of a designated finger of each registered user which is the registered biometric information of the registered user. The data concerning the registered biometric information may be, for example, a registered biometric image acquired by capturing an image of the fingerprint of a designated finger of the registered user. Alternatively, the data concerning the registered biometric information may be a feature quantity extracted for matching purposes from the registered biometric image itself or from a sub-region thereof.

The storage unit 4 also stores the guidance message for directing the user to place his finger on the designated position where the biometric information acquiring unit 3 can acquire the biometric input image correctly.

The storage unit 4 further stores class identification information, by associating it with each piece of registered biometric information, that identifies the class to which the registered biometric information belongs among the classes categorized according to the common features of the biometric information.

In the present embodiment, the fingerprint as the registered biometric information is classified into one of five classes, whorl, left loop, right loop, arch, and tented arch, according to the feature quantities extracted from the fingerprint.

FIGS. 2A to 2E are diagrams schematically illustrating the fingerprint classes, i.e., the whorl class 200, the left loop class 210, the right loop class 220, the arch class 230, and the tented arch class 240, respectively.

In each figure, an upward convex arc 201 indicates an upward convex core which is a singular point located in the center of a whorl of a plurality of ridges where the ridges are convex upward. On the other hand, a downward convex arc 202 indicates a downward convex core which is a singular point located in the center of a whorl of a plurality of ridges where the ridges are convex downward. Further, a downward pointing arrow 203 indicates the direction of the ridges forming the upward convex core. A triangle 204 indicates a delta singular point which is a singular point where ridges are formed in the shape of a delta.

As illustrated in FIG. 2A, the fingerprint belonging to the whorl class 200 includes the upward convex core 201, the downward convex core 202, and two delta singular points 204. The two delta singular points 204 are located so as to flank the line joining the upward and downward convex cores 201 and 202. Further, in the fingerprint belonging to the whorl class 200, the direction 203 of the ridges forming the upward convex core 201 is directed toward the downward convex core 202.

Figure 2B:
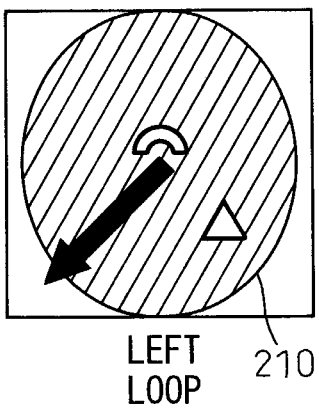
Figure 2C:
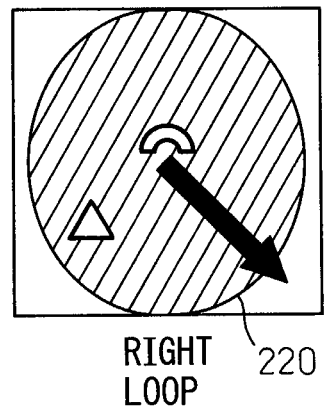

As illustrated in FIG. 2B, the fingerprint belonging to the left loop class 210 includes the upward convex core 201 and one delta singular point 204. Further, in the fingerprint belonging to the left loop class 210, the delta singular point 204 is located rightwardly of the upward convex core 201, and the direction 203 of the ridges forming the upward convex core 201 is directly diagonally downward to the left of the upward convex core 201. On the other hand, as illustrated in FIG. 2C, the fingerprint belonging to the right loop class 220 displays mirror-image symmetry with respect to the fingerprint belonging to the left loop class 210.

Figure 2D:
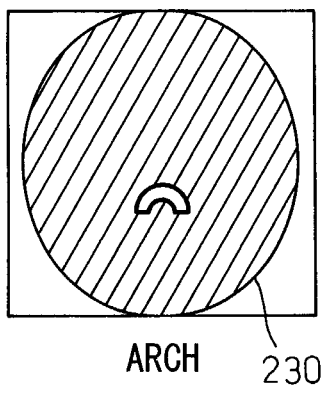
Figure 2E:
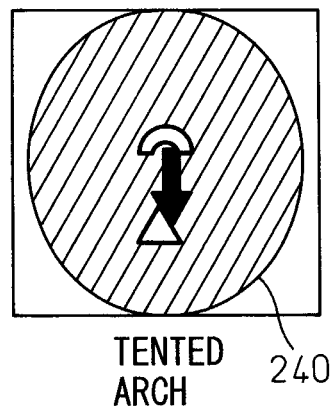

As illustrated in FIG. 2D, the fingerprint belonging to the arch class 230 includes the upward convex core 201 but includes no other singular points (that is, neither the downward convex core nor the delta singular point). On the other hand, as illustrated in FIG. 2E, the fingerprint belonging to the tented arch class 240 includes the upward convex core 201 and one delta singular point 204 located substantially directly below the upward convex core 201. The direction 203 of the ridges forming the upward convex core is directed toward the delta singular point 204.

In the present embodiment, when the registered biometric image representing the fingerprint which is the registered biometric information is acquired, the upward convex core, the downward convex core, and the delta singular point are detected as feature quantities from the registered biometric information. Then, based on the detected feature quantities, the registered biometric information is classified into the class closest to it among the five classes. The extraction of the feature quantities from the registered biometric information and the classification of the registered biometric information are performed in the same manner as the extraction of the feature quantities from the biometric input information and the classification of the biometric input information to be described later.

The processing unit 5 includes one or a plurality of processors and their peripheral circuitry. The processing unit 5 acquires the biometric input image representing the user's fingerprint which is the biometric input information from the biometric information acquiring unit 3, and carries out the biometric authentication process by using the acquired biometric input image.

Figure 3:
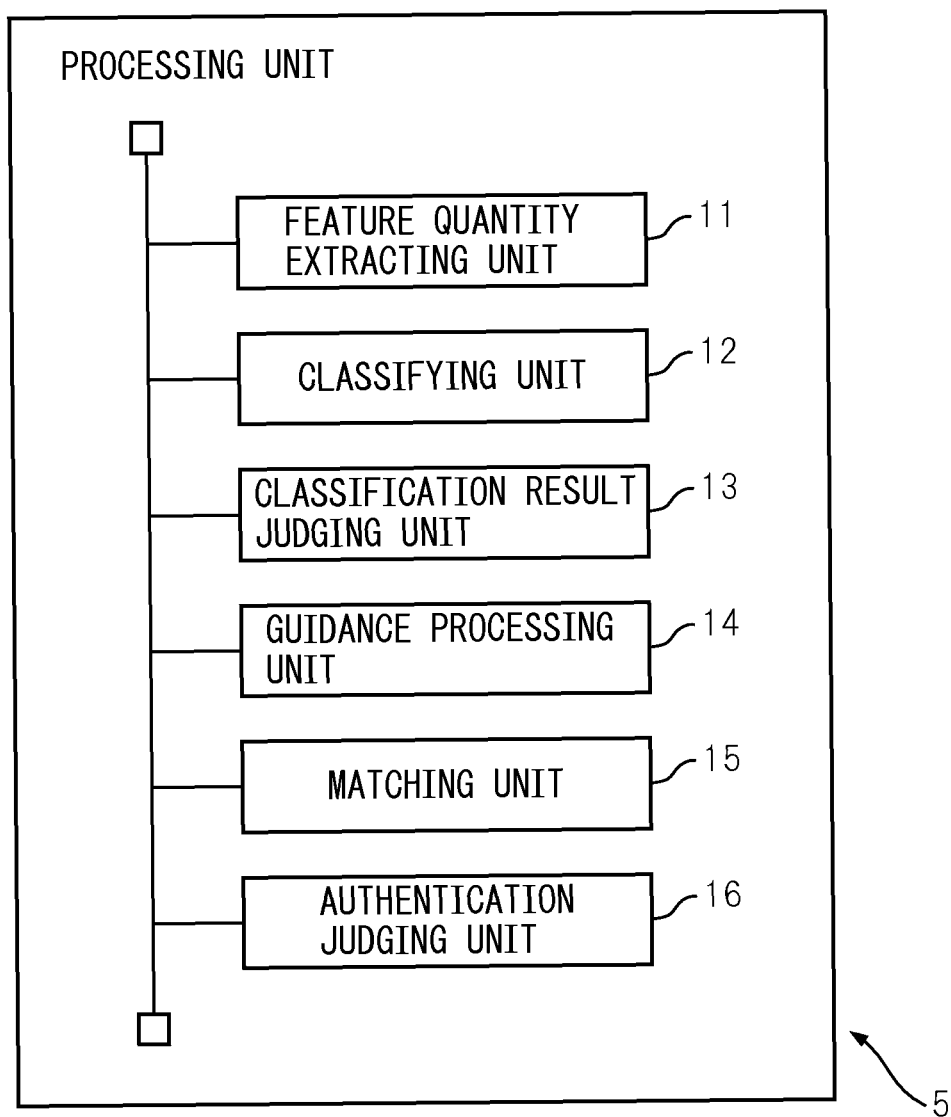
FIG. 3 is a functional block diagram of a processing unit incorporated in the biometric information processing apparatus, illustrating the functions to be implemented when performing a biometric authentication process to authenticate a user.

FIG. 3 is a functional block diagram of the processing unit 5, illustrating the functions to be implemented in order to carry out the biometric authentication process. As illustrated in FIG. 3, the processing unit 5 includes a feature quantity extracting unit 11, a classifying unit 12, a classification result judging unit 13, a guidance processing unit 14, a matching unit 15, and an authentication judging unit 16. These units constituting the processing unit 5 are functional modules implemented by executing a computer program on the processor incorporated in the processing unit 5. Alternatively, these units constituting the processing unit 5 may be implemented as firmware on the biometric information processing apparatus 1.

The feature quantity extracting unit 11 extracts the feature quantities based on which to determine into which class the biometric input information falls. In the present embodiment, the biometric input information as the fingerprint is classified into one of the fingerprint classes depicted in FIGS. 2A to 2E. For this purpose, the feature quantity extracting unit 11 detects the singular points, such as the upward convex core, the downward convex core, and the delta singular point, as the feature quantities that characterize the fingerprint patterns depicted in FIGS. 2A to 2E. The feature quantity extracting unit 11 may also detect the direction of the ridges forming the upward convex core and extract it as one of the feature quantities.

The feature quantity extracting unit 11 extracts the feature quantities in accordance, for example, with the following procedure.

First, by binarizing the biometric input image using a method of local thresholding, the feature quantity extracting unit 11 creates a binarized biometric image in which the pixels corresponding to the ridges and the pixels corresponding to the valleys have different values. Next, the feature quantity extracting unit 11 applies thinning to the binarized biometric image so that each ridge is represented by one pixel width. After that, the feature quantity extracting unit 11 obtains a correlation value by performing template matching between at least one template corresponding to the upward convex core and the thinned binarized biometric image. More specifically, the feature quantity extracting unit 11 performs the template matching while varying the position of the template relative to the thinned binarized biometric image, and obtains the correlation value between them at each position on the thinned binarized biometric image. Then, the feature quantity extracting unit 11 identifies the position where the highest correlation value is obtained on the thinned binarized biometric image. If the highest correlation value thus obtained is equal to or larger than a predetermined value (for example, 0.9), the feature quantity extracting unit 11 determines that the upward convex core is located at the identified position.

In a like manner, the feature quantity extracting unit 11 extracts the downward convex core and the delta singular point from the biometric input information by performing template matching between the thinned binarized biometric image and the template corresponding to the downward convex core or the delta singular point, respectively. However, for the delta singular point, the feature quantity extracting unit 11 identifies the position where the highest correlation value is obtained within the region centered about the point of the highest correlation but excluding the region of the size of the template of the delta singular point. If the correlation value for the identified position is equal to or larger than the predetermined value, the feature quantity extracting unit 11 determines that the delta singular point is also located at the identified position.

If the maximum value of the correlation computed between the thinned binarized biometric image and the template corresponding to the upward convex core is smaller than the predetermined value, the feature quantity extracting unit 11 does not extract the upward convex core from the biometric input information. Likewise, if the maximum value of the correlation computed between the thinned binarized biometric image and the template corresponding to the downward convex core or the delta singular point is smaller than the predetermined value, the feature quantity extracting unit 11 does not extract the downward convex core or the delta singular point.

Each template, for example, has a size just large enough to contain a plurality of ridges. The template corresponding to the upward convex core carries a binary pattern corresponding to the upward convex core, for example, a plurality of substantially concentric arcs convex upward. Similarly, the template corresponding to the downward convex core carries a binary pattern corresponding to the downward convex core, for example, a plurality of substantially concentric arcs convex downward. On the other hand, the template corresponding to the delta singular point carries a pattern in which ridges extend in three directions from one pixel.

When the upward convex core is extracted from the biometric input information, the feature quantity extracting unit 11 may obtain the directions of a plurality of ridges contained in a region that is located downward of the upward convex core in the vicinity of the position where the upward convex core was detected on the thinned binarized biometric image. Such a region, for example, has a horizontal width containing a plurality of ridges with the detected position of the upward convex core as the center of the horizontal direction and a vertical width containing a plurality of ridges with the detected position of the upward convex core as the upper edge thereof. The feature quantity extracting unit 11 determines the direction of the ridges forming the upward convex core by taking the average of the directions of the plurality of ridges contained in that region.

The feature quantity extracting unit 11 may extract the singular points, such as the upward convex core, the downward convex core, and the delta singular point, from the binary input image and the registered fingerprint image by using other known methods for detecting such singular points. Further, the feature quantity extracting unit 11 may obtain the direction of the ridges forming the upward convex core by using any known method for obtaining ridge directions.

The feature quantity extracting unit 11 may also determine the ridge spacing by calculating the average spacing between the plurality of ridges on the thinned binarized biometric image.

Further, by binarizing the entire biometric input image based, for example, on its average luminance value, the feature quantity extracting unit 11 creates a biometric region image in which the region containing the biometric information and the other region have different values.

For each detected singular point, the feature quantity extracting unit 11 passes information identifying the type of the singular point (i.e., upward convex core, downward convex core, or delta singular point) to the classifying unit 12 together with the detected position of the singular point on the biometric input image. When the direction of the ridges forming the upward convex core is obtained, the feature quantity extracting unit 11 passes the direction of the ridges to the classifying unit 12. The feature quantity extracting unit 11 also passes the ridge spacing and the biometric region image to the classifying unit 12.

Based on the feature quantities extracted by the feature quantity extracting unit 11, the classifying unit 12 classifies the biometric input information into at least one of the plurality of classes.

If the user does not place his finger properly on the sensor face of the biometric information acquiring unit 3, only a portion of his fingerprint may be captured in the biometric input image. In particular, when, for example, the sensor face of the biometric information acquiring unit 3 is small, the slightest displacement of the finger relative to the sensor face may result in a failure to capture some of the singular points in the biometric input image, because only a portion of the fingerprint is captured in the biometric input image.

In such cases, the feature quantity extracting unit 11 may not be able to detect some of the singular points from the biometric input image. As a result, the biometric input information may not be classified into the correct class. However, depending on the class to which the biometric input information belongs, the biometric input information can be classified into the correct class, even when some of the singular points are not captured in the biometric input image.

In view of this, for each class to which the biometric input information is judged to belong, the classifying unit 12 obtains the confidence level that indicates the degree of certainty that the biometric input information belongs to that class, according to the extracted feature quantities or the combination of the feature quantities. For example, the classifying unit 12 determines the confidence level and the class according to the extracted feature quantities by referring to the confidence level table stored in the storage unit 4.

Referring to FIGS. 4 to 6, a description will be given of the relationship between the detected singular point and the confidence level defined for each class for the case where only a portion of the fingerprint is captured in the biometric input image.

FIGS. 4A to 4E are diagrams illustrating the relationship between the detected singular point and each predefined class for the case where only the upper portion of the fingerprint is captured in the biometric input image. FIGS. 4A to 4E correspond to the whorl class, the left loop class, the right loop class, the arch class, and the tented arch class, respectively.

In each figure, the entire biometric input image is represented by a rectangle 400. A hatched region 410 indicates the region where the fingerprint is captured in the biometric input image. An upward convex arc 401 indicates an upward convex core. On the other hand, a downward convex arc 402 indicates a downward convex core. Further, a downward pointing arrow 403 indicates the direction of the ridges forming the upward convex core. A triangle 404 indicates a delta singular point. Of the singular points and the direction of the ridges, those detected by the feature quantity extracting unit 11 are indicated by solid lines. On the other hand, dashed lines indicate the portions that failed to be detected by the feature quantity extracting unit 11 because they are located outside the region 410 where the fingerprint is captured.

As illustrated in FIGS. 4A to 4E, suppose that the detected singular point is only the upward convex core 401 and that the upward convex core 401 is located near the lower edge of the region 410. In this case, there is the possibility that the downward convex core or the delta singular point may be contained in the region where the fingerprint is not captured. However, since the fingerprint pattern below the upward convex core 401 is not captured in the biometric input image 400, the feature quantity extracting unit 11 is unable to determine whether or not the downward convex core 402 or the delta singular point 404 exists on the fingerprint. Furthermore, it is difficult for the feature quantity extracting unit 11 to determine the direction of the rides forming the upward convex core 401. As a result, the fingerprint captured in the biometric input image 400 can belong to any of the classes.

Therefore, in this case, it is preferable that the classifying unit 12 classifies the biometric input information represented by the biometric input image 400 as belonging to any of the classes and sets the confidence level for each class to a low value.

FIGS. 5A to 5E are diagrams illustrating fingerprints, each belonging to the whorl class and captured in a biometric input image, for the case where one or more of the singular points are located outside the fingerprint region defined on the biometric input image.

In each figure, the entire biometric input image is represented by a rectangle 500. A hatched region 510 indicates the region where the fingerprint is captured in the biometric input image. An upward convex arc 501 indicates an upward convex core. On the other hand, a downward convex arc 502 indicates a downward convex core. A triangle 504 indicates a delta singular point. Of the singular points, those detected by the feature quantity extracting unit 11 are indicated by solid lines. On the other hand, dashed lines indicate the portions that failed to be detected by the feature quantity extracting unit 11 because they are located outside the region 510 where the fingerprint is captured.

In FIGS. 5A, 5B, and 5E, one or both of the two delta singular points are not detected, but the other singular points are detected. However, no other fingerprints than those belonging to the whorl class have both the upward convex core and the downward convex core simultaneously.

On the other hand, in FIGS. 5C and 5D, one or the other of the upward and downward convex cores is not detected, but the other singular points are detected. However, no other fingerprints than those belonging to the whorl class have two delta singular points.

Accordingly, in the cases illustrated in FIGS. 5A to 5E, while one or more of the singular points are not detected, it is preferable to classify the fingerprint represented by the biometric input image 500 into the whorl class and to provide a high confidence level to the whorl class.

In this way, when there are a plurality of classes to which the biometric input information is likely to belong, the classifying unit 12 classifies the biometric input information as belonging to the plurality of classes. On the other hand, when there is only one class to which the biometric input information is likely to belong, the classifying unit 12 classifies the biometric input information as belonging to that one class. Then, the smaller the number of classes to which the biometric input information is classified as belonging, the higher the confidence level is set for each class by the classifying unit 12.

Further, the larger the area of the region where the biometric input information is captured, the more accurately it can be determined whether any undetected singular point is contained in the biometric input information. In view of this, the classifying unit 12 may vary the number of classes into which the biometric input information is classified as belonging and the confidence level for each class, according to the size of the area of the region where the biometric input information is captured.

Referring to FIGS. 6A and 6B, a description will be given below of an example of how the confidence level for each class into which the biometric input information is classified is varied according to the size of the region where the fingerprint is captured.

In each figure, the entire biometric input image is represented by a rectangle 600. A hatched region 610 indicates the region where the fingerprint is captured in the biometric input image. An upward convex arc 601 indicates an upward convex core. On the other hand, a downward convex arc 602 indicates a downward convex core. A triangle 604 indicates a delta singular point. Of the singular points, those detected by the feature quantity extracting unit 11 are indicated by solid lines. On the other hand, dashed lines indicate the portions that failed to be detected by the feature quantity extracting unit 11.

In FIG. 6A, the minimum distance, d, from the upward convex core 601 to the right edge of the fingerprint region 610 is so short that if there is any delta singular point rightwardly of the upward convex core, such a delta singular point will be located outside the fingerprint region. As a result, the feature quantity extracting unit 11 is unable to detect whether there is a downward convex core and whether there is any delta singular point rightwardly of the upward convex core. In this case, it is preferable that the classifying unit 12 classifies the biometric input information as belonging to both the whorl class and the right loop class and sets the confidence level to the same value for the two classes. Furthermore, since the classifying unit 12 is unable to determine which of the classes, the whorl class or the right loop class, the biometric input information belongs, it is preferable to set the confidence level for these two classes lower than the confidence level for the case where the biometric input information is classified into one predefined class.

On the other hand, in FIG. 6B, the minimum distance, d, from the upward convex core 601 to the right edge of the fingerprint region 610 is long enough that if there is any delta singular point rightwardly of the upward convex core, such a delta singular point will definitely be located inside the fingerprint region. As a result, the feature quantity extracting unit 11 can determine that there is no downward convex core, nor is there any delta singular point rightwardly of the upward convex core. It is therefore preferable that the classifying unit 12 classifies the biometric input information as belonging to only the right loop class. It is also preferable that the classifying unit 12 sets the confidence level for the right loop class in this case higher than the confidence level for the right loop class in the case of FIG. 6A.

As described above, when only the upward convex core 601 and the delta singular point 604 at the left are detected, the classifying unit 12 uses the minimum distance, d, from the upward convex core 601 to the right edge of the fingerprint region 610 (i.e., the biometric region), as a measure of the size of the fingerprint region. The classifying unit 12 varies the confidence levels for the whorl class and the right loop class, respectively, according to the minimum distance, d.

More specifically, if the minimum distance, d, is larger than a predetermined threshold value Tdi, the classifying unit 12 classifies the biometric input information into the right loop class and sets the confidence level for the right loop class to the highest value that the confidence level can take. On the other hand, if the minimum distance, d, is not larger than the threshold value Tdi, the classifying unit 12 classifies the biometric input information as belonging to both the whorl class and the right loop class, and sets the confidence level for both the whorl class and the right loop class to one half of the highest value that the confidence level can take. Alternatively, the classifying unit 12 may set the confidence level for the right loop class higher and the confidence level for the whorl class lower as the minimum distance, d, increases. In this case, the classifying unit 12 determines the confidence level Rw for the whorl class and the confidence level Rr for the right loop class, respectively, in accordance with the following equations.

$$Rw = 100 \times (1 - d/Tdi)$$

$$Rr = 100 \times d/Tdi$$

For example, when there is a delta singular point rightwardly of the upward convex core, the predetermined threshold value Tdi can be set to a value corresponding to the distance from the upward convex core to the right edge of the rightwardly located delta singular point.

Further, finger size varies among individual users. Therefore, it is preferable to set the threshold value Tdi larger as the finger size increases. In view of this, the classifying unit 12 corrects the threshold value Tdi by using the ridge spacing as a measure of the finger size. For example, if the threshold value for standard ridge spacing P0 is Td0, and the ridge spacing detected from the biometric input information is Pi, the classifying unit 12 determines the threshold value Tdi in accordance with the following equation.

$$Tdi = Td0 \times Pi/P0$$

As described above, the classifying unit 12 can use the distance from the detected singular point to the undetected singular point as a measure of the size of the fingerprint region. As another example, the classifying unit 12 may use the vertical distance L from the upward convex core to the lower edge of the fingerprint region as a measure of the size of the fingerprint region.

The classifying unit 12 can obtain the minimum distance, d, and the distance L by calculating the distance between the position of the upward convex core determined by the feature quantity extracting unit 11 and the boundary of the fingerprint region defined on the biometric region image.

FIG. 7 is a diagram illustrating one example of the confidence level table. In the confidence level table 700 of FIG. 7, the columns in each row indicate, from left to right, the following fields: TOTAL NUMBER OF DETECTED SINGULAR POINTS, NUMBER OF DETECTED UPWARD CONVEX CORES, NUMBER OF DETECTED DOWNWARD CONVEX CORES, NUMBER OF DETECTED DELTA SINGULAR POINTS, CONFIDENCE LEVEL, CRITERIA, and CLASS.

As a first example, if an upward convex core, a downward convex core, and a delta singular point are detected from biometric input information, then by referring to row 701 in the confidence level table 700 the classifying unit 12 classifies the biometric input information into the whorl class and sets the confidence level for the whorl class to 100. In this case, the classifying unit 12 sets the confidence level for the other classes to 0.

As a second example, if an upward convex core and a delta singular point located leftwardly of the upward convex core are detected from biometric input information, and the space left on the right of the upward convex core in the fingerprint region is small, the classifying unit 12 refers to row 702 in the confidence level table 700. Then, the classifying unit 12 classifies the biometric input information as belonging to both the whorl class and the right loop class, and sets the confidence level for both the whorl class and the right loop class to 50. In this case, the classifying unit 12 sets the confidence level for the other classes to 0.

In the confidence level table 700, the direction of the ridges forming the upward convex core is not used in determining the confidence level for each class. However, the confidence level table may be constructed so as to determine the confidence level for each class by also using the direction of the ridges forming the upward convex core. Further, the confidence level table need not necessarily include the total number of detected singular points.

The classifying unit 12 may classify the biometric input information into one of the classes by using some other suitable method, and may set the confidence level for the determined class. For example, the classifying unit 12 may classify the biometric input information by using a machine learning system that takes feature quantities as inputs and that outputs the result of the classification of the biometric information. The machine learning system used may be, for example, a perceptron neural network or a single or multiple stages of support vector machines. To train such a machine learning system, feature quantities to be used for classification purposes are extracted from a plurality of pieces of biometric information whose classes are known in advance. Then, the machine learning system can be trained by a learning algorithm, such as back propagation, by using the extracted feature quantities and the classification results of the corresponding biometric information as the teaching data.

The classifying unit 12 passes the identification information of the class into which the biometric input information has been classified and the confidence level computed for that class to the classification result judging unit 13.

The classification result judging unit 13 judges whether the classification result of the biometric input image acquired by the biometric information acquiring unit 3 is correct or not. For this purpose, the classification result judging unit 13 determines the highest confidence level Rmax among the confidence levels computed for the classes into which the biometric input information has been classified. Then, the classification result judging unit 13 compares Rmax with a classification result judging threshold value Tjmax predefined for the class corresponding to Rmax. If Rmax is higher than the threshold value Tjmax, the classification result judging unit 13 judges that the biometric input information has been correctly classified into the class corresponding to Rmax. It is therefore determined that the biometric input information is suited to use for matching against the registered biometric information that belongs to the class corresponding to Rmax. On the other hand, if Rmax is not higher than the threshold value Tjmax, the classification result judging unit 13 judges that the biometric input information has been incorrectly classified as belonging to the class corresponding to Rmax. It is therefore determined that the biometric input image is not suited to use for matching.

If there are a plurality of classes corresponding to Rmax, the classification result judging unit 13 compares Rmax with each of a plurality of classification result judging threshold values Tjc predefined for the respective classes (c=1, 2, ..., n, where n is the total number of classes to which the biometric input information has been classified as belonging). Then, if Rmax for a given class k ($1 \leq k \leq n$) is higher than the classification result judging threshold value Tjk, the classification result judging unit 13 judges that the biometric input information has been correctly classified into that class k. On the other hand, if Rmax for any of the classes is not higher than the corresponding classification result judging threshold value Tjc, the classification result judging unit 13 judges that the classification result of the biometric input image is not correct.

Preferably, the classification result judging threshold value Tjc for any given class is set higher as the probability of misclassifying the biometric information belonging to that given class as belonging to some other class is higher. With this arrangement, for any class where the probability of misclassification is high, if the feature quantities for classification purposes that characterize the biometric information belonging to that class have not been extracted accurately from the biometric input information, then the classification result judging unit 13 can judge that the classification result of the biometric input image is not correct. The classification result judging unit 13 can thus reduce the possibility of incurring a binning error in which the biometric input information of the user is classified as belonging to a class different than the class assigned to it at the time of registration.

On the other hand, for any class where the probability of misclassification is low, even if some of the feature quantities for classification purposes that characterize the biometric information belonging to that class failed to be extracted from the biometric input information, the classification result judging unit 13 can judge that the classification result of the biometric input image is correct. The classification result judging unit 13 can thus prevent the biometric input information from being reacquired when the biometric input image has been correctly classified.

For example, among the fingerprint classes illustrated in FIGS. 2A to 2E, the classification result judging threshold value is preferably set lowest for the whorl class. The reason is that the fingerprint belonging to the whorl class is least likely to be misclassified because it has features (for example, a downward convex core) that are not found in the fingerprints belonging to the other classes. On the other hand, the classification result judging threshold value is preferably set higher for the arch class than for any other class. The fingerprint belonging to the arch class does not have a singular point that is not found in the fingerprints belonging to the other classes. As a result, the fingerprint belonging to the arch class is more likely to be misclassified than the fingerprints belonging to the other classes.

The classification result judging unit 13 passes the result of the judgment to the processing unit 5. When it is judged that the classification result of the biometric input information is correct, the classification result judging unit 13 also passes to the processing unit 5 the identification information of the class into which the biometric input information has been classified. If it is judged that the classification result is not correct, the processing unit 5 passes the result of the judgment to the guidance processing unit 14. On the other hand, if it is judged that the classification result is correct, the processing unit 5 passes the biometric input image, as well as the identification information of the class into which the biometric input information has been classified, to the matching unit 15.

When the result of the judgment indicating that the classification result of the biometric input information is not correct is received from the processing unit 5, the guidance processing unit 14 retrieves from the storage unit 4 a guidance message for prompting the user to reenter the biometric input information.

Then, the guidance processing unit 14 displays the guidance message on the display unit 2. If the biometric information processing apparatus 1 is equipped with a speaker, the guidance processing unit 14 may reproduce the guidance message through the speaker to audibly alert the user.

When the biometric input image and the identification information of the class into which the biometric input information has been classified are received from the processing unit 5, the matching unit 15 matches the biometric input information against a set of registered biometric information stored in the storage unit 4 as belonging to the same class as the biometric input information. Then, the matching unit 15 obtains, as a result of the matching, the degree of similarity between the biometric input information and the registered biometric information.

The matching unit 15 may use such techniques as minutiae matching or pattern matching to perform the matching.

When performing the matching between the biometric input information and registered biometric information by minutiae matching, the matching unit 15 extracts feature points for matching purposes from the biometric input information. Then, the matching unit 15 performs the matching by using the feature points extracted from the biometric input information and the plurality of feature points extracted from the registered biometric information and stored in the storage unit 4 as the data concerning the registered biometric information.

The matching unit 15 extracts, for example, fingerprint ridge properties such as ridge endings and bifurcations as the feature points (minutiae) for matching. To extract the ridge bifurcations and endings from the biometric input image, the matching unit 15 generates from the biometric input image a binarized image with thinned ridges by performing the same processing as the feature quantity extracting unit 11. After that, the matching unit 15 scans the thinned biometric input image by using a plurality of mask patterns, and detects the position on the biometric input image where it matches one of the mask patterns. Then, the matching unit 15 extracts the pixel at the center of the detected position as a feature point. Each mask pattern used is represented, for example, by 3×3 pixels, and has a binary pattern corresponding to a ridge bifurcation or ending. Further, the matching unit 15 obtains the position of the extracted feature point and the ridge direction near the feature point as the information representing the feature point. The matching unit 15 can use any known method in order to obtain the ridge direction near the feature point.

Feature points are also extracted from the registered biometric image by performing the same processing as that performed on the biometric input image, and the position of each extracted feature point and the ridge direction near the feature point are stored in the storage unit 4.

The matching unit 15 may extract the feature points from the biometric input image by using any other known method that obtains ridge endings or bifurcations as feature points.

The matching unit 15 selects, as a first reference feature point, the feature point located at or near the center of the region representing the registered biometric information in the registered biometric image. Further, the matching unit 15 selects one of the feature points extracted from the biometric input image as a second reference feature point. Then, the matching unit 15 translates the biometric input image so as to bring the second reference feature point into registry with the first reference feature point. After that, while rotating the biometric input image, the matching unit 15 obtains the number of feature points of the biometric input image that match the feature points of the registered biometric image. By repeating the above process while changing the combination of the first reference feature point and the second reference feature point, the matching unit 15 obtains the maximum number of feature points of the biometric input image that match the feature points of the registered biometric image.

Finally, the matching unit 15 computes the degree of similarity by dividing the maximum number by the total number of feature points extracted from the biometric input image. In this case, the degree of similarity takes any value between 0 and 1, and the higher the degree of similarity between the biometric input information and the registered biometric information, the closer to 1 the value of the degree of similarity.

To detect the feature points of the biometric input information that match the feature points of the registered biometric information, the matching unit 15 examines whether a feature point of the registered biometric information exists within a predetermined range centered at the position of an attention feature point of the biometric input information. The predetermined range may be chosen to have a value equivalent, for example, to the average spacing between two adjacent ridges. If a feature point of the registered biometric information exists within the predetermined range centered at the position of the attention feature point, the matching unit 15 obtains the angle difference between the ridge directions near the respective feature points. If the absolute angle difference between the ridge directions falls within a predetermined angle range, the matching unit 15 determines that the feature point of the registered biometric information matches the attention feature point of the biometric input information. The predetermined angle range is chosen to have a value corresponding to an allowable range within which the ridge direction near the attention feature point can be considered to match the ridge direction near the corresponding feature point of the registered biometric information, and may be set, for example, to 10 degrees. Alternatively, the matching unit 15 may determine that the feature point of the registered biometric information that matches the attention feature point of the biometric input information exists, only when the same kind of feature point of the registered biometric information as the attention feature point exists within the predetermined range centered at the position of the attention feature point. The matching unit 15 may use other known methods to obtain the number of feature points of the registered biometric information that match the feature points of the biometric input information.

On the other hand, when performing the matching between the biometric input information and the registered biometric information by pattern matching, the matching unit 15 uses the biometric input image representing the biometric input information and the registered biometric image stored in the storage unit 4 as the data concerning the registered biometric information. Then, while variously changing the position of the biometric input image relative to the registered biometric image, the matching unit 15 computes the correlation c(i, j) between the biometric input image and the registered biometric image by using the following equation.

$$c(i, j) = \frac{\sum_x \sum_y \{(I(x, y) - I_{av})(T(x-i, y-j) - T_{av})\}}{\sqrt{\sum_x \sum_y (I(x, y) - I_{av})^2 \sum_x \sum_y (T(x-i, y-j) - T_{av})^2}} \quad (1)$$

where I(x, y) represents the pixel value of a pixel contained in the biometric input image and located at a position designated by a horizontal coordinate x and a vertical coordinate y. Further, T(x−i, y−i) represents the pixel value of a pixel contained in the registered biometric image and located at a position designated by a horizontal coordinate (x−i) and a vertical coordinate (y−i). On the other hand, $I_{av}$ is the average pixel value of the pixels contained in the biometric input image, while $T_{av}$ is the average pixel value of the pixels contained in the registered biometric image. Here, i and j each indicate the amount of displacement between the biometric input image and the registered biometric image in the horizontal direction or the vertical direction, respectively. Further, c(i, j) represents the correlation value when the biometric input image is displaced relative to the registered biometric image by i pixels in the horizontal direction and j pixels in the vertical direction. The correlation value c(i, j) can take any value between −1 and 1. The correlation value c(i, j) is 1 when the biometric input image perfectly matches the registered biometric image. On the other hand, when the biometric input image is completely reversed with respect to the registered biometric image, the correlation value c(i, j) is −1.

From among the computed degrees of similarity, the matching unit 15 obtains the highest degree of similarity that indicates the registered biometric information most similar to the biometric input information. Then, the matching unit 15 passes the highest degree of similarity to the authentication judging unit 16 together with the identification information of the registered user associated with the registered biometric information corresponding to the highest degree of similarity.

If the highest degree of similarity is equal to or greater than an authentication judging threshold value, the authentication judging unit 16 judges that the biometric input information matches the registered biometric information. Then, the authentication judging unit 16 authenticates the user as being the registered user associated with the registered biometric information judged to match the biometric input information. When the user is authenticated, the authentication judging unit 16 reports the result of the authentication to the processing unit 5. Then, the processing unit 5 permits the authenticated user to use the apparatus equipped with the biometric information processing apparatus 1 or the apparatus connected to the biometric information processing apparatus 1.

On the other hand, if the highest degree of similarity is lower than the authentication judging threshold value, the authentication judging unit 16 judges that the biometric input information does not match the registered biometric information. In this case, the authentication judging unit 16 does not authenticate the user. The authentication judging unit 16 notifies the processing unit 5 of the result of the authentication indicating the failure to authenticate the user. The processing unit 5 denies the unauthenticated user an access to the apparatus equipped with the biometric information processing apparatus 1 or the apparatus connected to the biometric information processing apparatus 1. Further, the processing unit 5 causes the display unit 2 to display a message indicating that the authentication has failed.

It is preferable to set the authentication judging threshold value to such a value that the authentication judging unit 16 succeeds to authenticate the user only when the user is a legitimate registered user. It is also preferable to set the authentication judging threshold value to such a value that the authentication judging unit 16 fails to authenticate the user when the user is a person other than a legitimate registered user. For example, the authentication judging threshold value may be determined by multiplying the difference between the maximum and minimum values that the degree of similarity can take by 0.7 and adding the resulting product to the minimum value of the degree of similarity.

Figure 8:
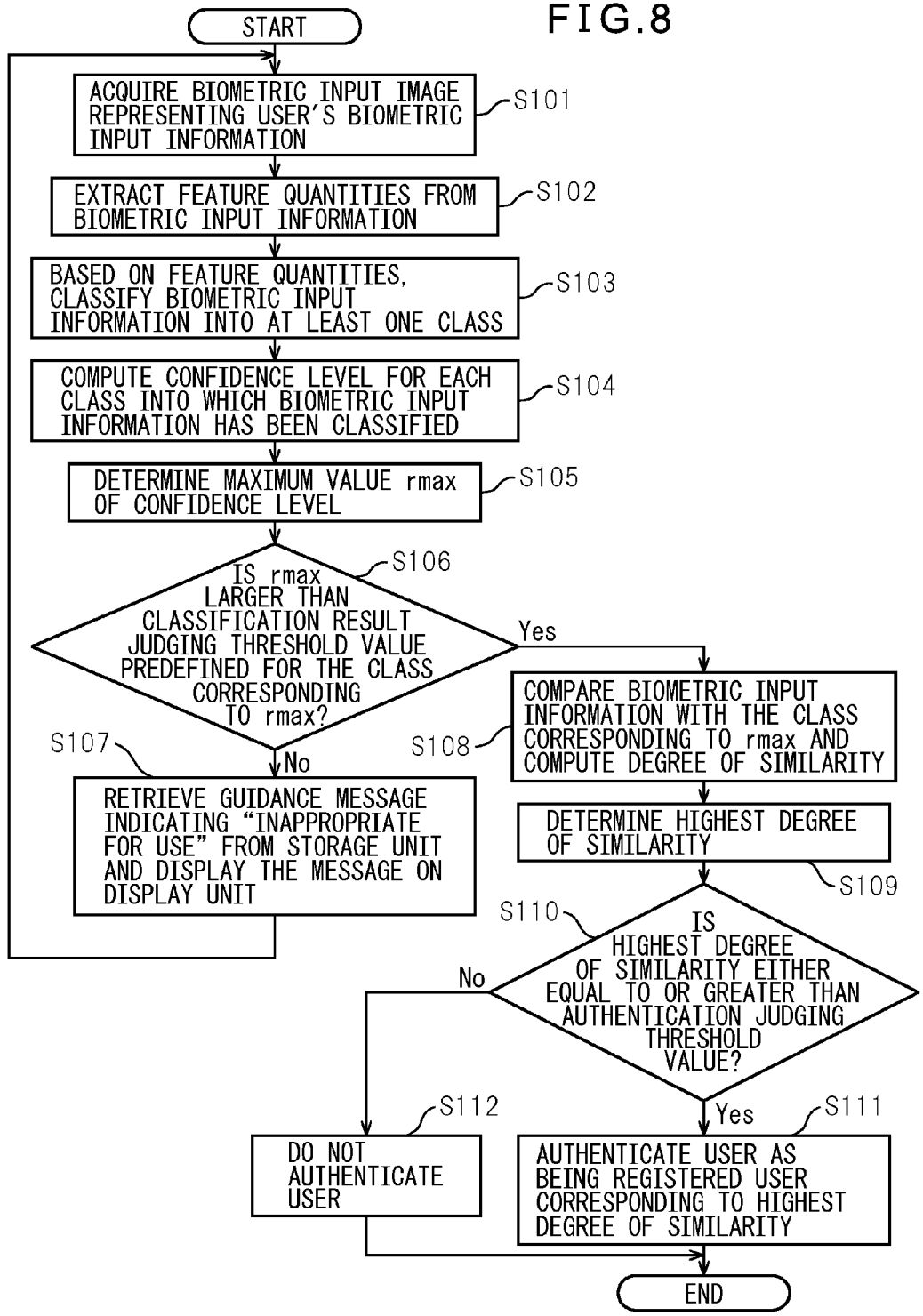
FIG. 8 is an operation flowchart of the biometric authentication process which is performed under the control of a computer program executed on the processing unit.

FIG. 8 is an operation flowchart of the biometric authentication process which is performed under the control of a computer program executed on the processing unit 5.

As illustrated in FIG. 8, the processing unit 5 acquires a biometric input image representing the user's biometric information via the biometric information acquiring unit 3 (step S101). The processing unit 5 passes the biometric input image to the feature quantity extracting unit 11 in the processing unit 5.

The feature quantity extracting unit 11 extracts from the biometric input information the feature quantities based on which the biometric input image is classified into one of the plurality of classes categorized according to the common features of the biometric information (step S102). The feature quantity extracting unit 11 passes the extracted feature quantities to the classifying unit 12 in the processing unit 5.

The classifying unit 12 classifies the biometric input information into at least one of the classes based on the feature quantities (step S103). The classifying unit 12 computes the confidence level for each class into which the biometric input information has been classified (step S104). The classifying unit 12 passes the identification information of the class into which the biometric input information has been classified and the confidence level computed for that class to the classification result judging unit 13.

The classification result judging unit 13 that received the confidence level computed by the classifying unit 12 for each class into which the biometric input information has been classified determines the maximum value rmax of the confidence level (step S105).

Then, the classification result judging unit 13 judges whether rmax is larger than the classification result judging threshold value predefined for the class corresponding to that rmax (step S106).

If rmax is not larger than the classification result judging threshold value predefined for the class corresponding to that rmax (No in step S106), the classification result judging unit 13 judges that the classification result of the biometric input information is not correct. The classification result judging unit 13 then returns the result of the judgment to the processing unit 5.

The processing unit 5 notifies the guidance processing unit 14 that the classification result of the biometric input information is not correct, i.e., the biometric input image has been judged inappropriate to use for matching. The guidance processing unit 14 that received the notification from the processing unit 5 retrieves from the storage unit 4 a guidance message indicating that the biometric input image has been judged inappropriate for use. Then, the guidance processing unit 14 displays the guidance message on the display unit 2 (step S107). After that, the processing unit 5 returns control to step S101, and acquires via the biometric information acquiring unit 3 a biometric input image re-acquired by rereading the user's body part. Then, the processing unit 5 returns to step S101 to repeat the above process.

On the other hand, if rmax is larger than the classification result judging threshold value predefined for the class corresponding to that rmax (Yes in step S106), the classification result judging unit 13 judges that the biometric input information has been correctly classified into the class corresponding to the rmax. Then, the classification result judging unit 13 returns the result of the judgment to the processing unit 5 together with the identification information of the class corresponding to the rmax.

The processing unit 5 passes the biometric input image representing the biometric input information and the identification information of the class corresponding to the rmax to the matching unit 15. Upon receiving the biometric input image and the identification information of the class corresponding to the rmax, the matching unit 15 retrieves from the storage unit 4 the data concerning the registered biometric information that belongs to the same class as the biometric input image. The matching unit 15 compares the biometric input information with the registered biometric information belonging to the same class as the biometric input information. Then, the matching unit 15 computes the degree of similarity between the biometric input information and the registered biometric information belonging to the same class (step S108). From among the computed degrees of similarity, the matching unit 15 determines the highest degree of similarity that indicates the registered biometric information most similar to the biometric input information (step S109). Then, the matching unit 15 passes the highest degree of similarity to the authentication judging unit 16 in the processing unit 5, together with the identification information of the registered user associated with the registered biometric information corresponding to the highest degree of similarity.

The authentication judging unit 16 judges whether or not the highest degree of similarity is equal to or greater than the authentication judging threshold value (step S110).

If the highest degree of similarity is equal to or greater than the authentication judging threshold value (Yes in step S110), the authentication judging unit 16 authenticates the user as being the registered user corresponding to the highest degree of similarity (step S111).

On the other hand, if the highest degree of similarity is lower than the authentication judging threshold value (No in step S110), the authentication judging unit 16 does not authenticate the user (step S112).

After step S111 or S112, the processing unit 5 terminates the biometric authentication process.

The processing unit 5 may execute the steps S103 and S104 concurrently.

As described above, the biometric information processing apparatus according to the first embodiment classifies the biometric input information, i.e., the user's biometric information captured as a biometric input image, into at least one of the plurality of classes categorized according to the common features of the biometric information. At this time, the biometric information processing apparatus determines the confidence level that indicates the degree of certainty that the registered biometric information belongs to the same class as the biometric input information; then, by comparing the confidence level with the classification result judging threshold value predefined for each class, the biometric information processing apparatus determines whether there is a need to re-acquire the biometric input image.

In this way, the biometric information processing apparatus can acquire biometric information suited to use for matching, while preventing unnecessary reacquisition of the biometric information and thus preventing the processing time from increasing.

The biometric information processing apparatus may perform the so-called one-to-one matching in which the registered biometric information to be compared with the biometric input information is specified by the user's identification information, etc. In this case, the classification result judging unit in the processing unit judges whether the class to which the registered biometric information specified by the registered user's identification information acquired via the input unit matches the class into which the biometric input information has been classified. If both classes match, the biometric information processing apparatus proceeds to perform the matching process. If they do not match, the biometric information processing apparatus performs processing using the guidance processing unit and re-acquires the biometric input image. If the classification result of the biometric input information is incorrect, the biometric input image representing the biometric input information is inappropriate to use for matching, because the incorrect classification is a result of a failure to extract the characteristic features of the biometric input information from the biometric input image. Accordingly, even when performing the one-to-one matching, the biometric information processing apparatus can prevent the matching process from being performed using an incorrectly acquired biometric input image.

Next, a biometric information processing apparatus which carries out a biometric authentication process according to a second embodiment will be described. According to the second embodiment, if the biometric input image is judged inappropriate to use for matching, the biometric information processing apparatus estimates the positioning of the user's body part including the biometric input information, relative to the sensor face of the biometric information acquiring unit at the time of the acquisition of the biometric input image. Then, the biometric information processing apparatus presents a guidance message appropriate to the estimated positioning to the user so that the biometric input image can be reacquired by guiding the user so as to place his designated body part properly on the sensor face and hold the body part in the right position.

The biometric information processing apparatus according to the second embodiment is substantially the same as the biometric information processing apparatus according to the first embodiment, except for differences in some of the functions of the processing unit. Therefore, the functions of the processing unit in the biometric information processing apparatus according to the second embodiment will be described below by focusing on the differences from the functions of the processing unit in the biometric information processing apparatus according to the first embodiment.

Figure 9:
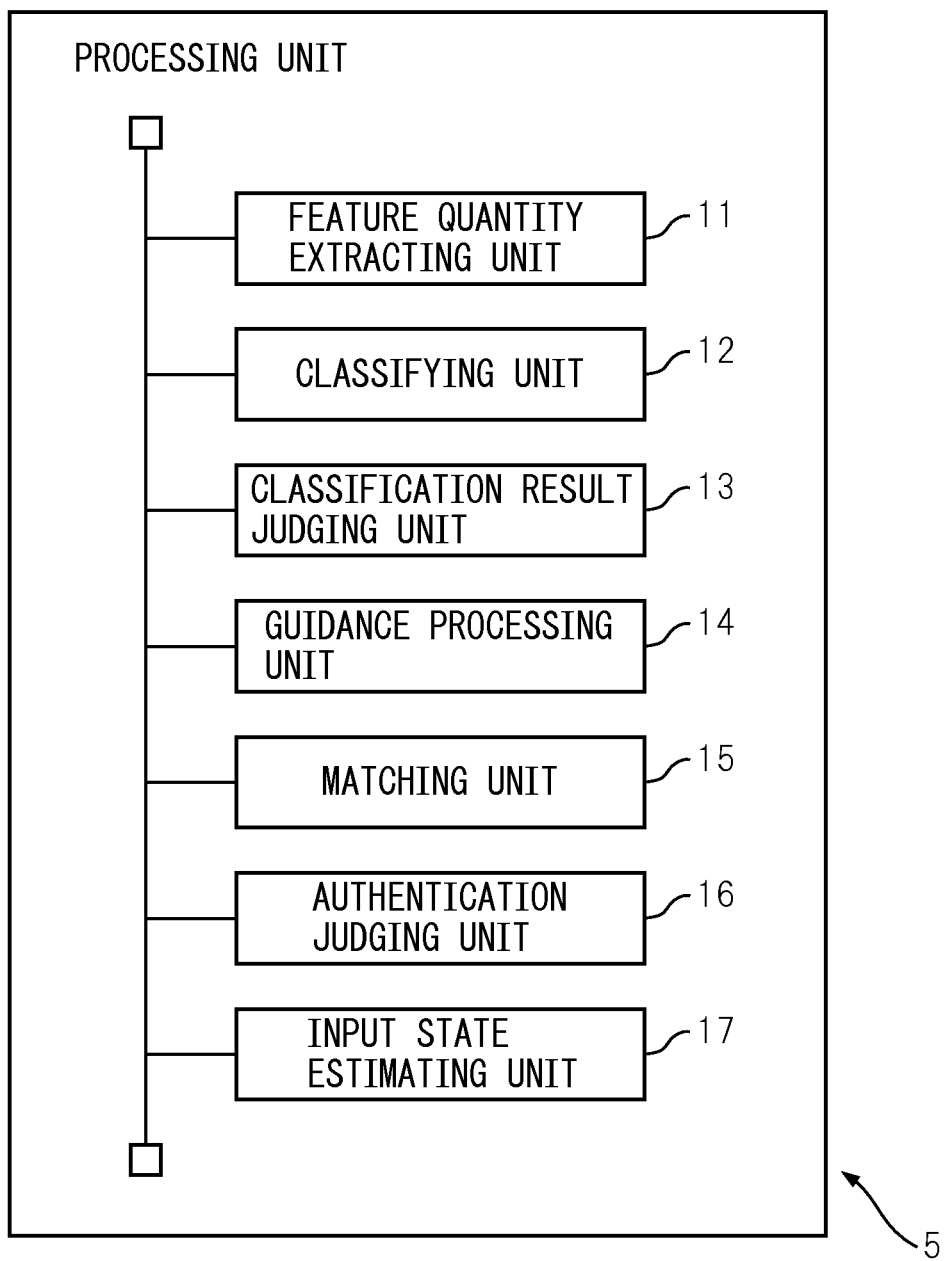
FIG. 9 is a functional block diagram of a processing unit incorporated in a biometric information processing apparatus according to a second embodiment.

FIG. 9 is a functional block diagram of the processing unit incorporated in the biometric information processing apparatus according to the second embodiment. As illustrated in FIG. 9, the processing unit 5 includes a feature quantity extracting unit 11, a classifying unit 12, a classification result judging unit 13, a guidance processing unit 14, a matching unit 15, an authentication judging unit 16, and an input state estimating unit 17. In FIG. 9, the functional blocks of the processing unit 5 corresponding to those of the processing unit 5 illustrated in FIG. 3 are respectively designated by the same reference numerals.

If it is judged by the classification result judging unit 13 that the classification result of the biometric input information is not correct, the input state estimating unit 17 estimates the positioning of the user's body part including the biometric input information, relative to the sensor face of the biometric information acquiring unit 3 at the time of the acquisition of the biometric input image.

In the present embodiment, the input state estimating unit 17 uses at least one of the following values in order to estimate the positioning:

The area size of the biometric region that defines the region where the biometric input information carried in the biometric input image is contained.

The distance from the position of each singular point detected by the feature quantity extracting unit 11 to the boundary of the biometric region.

The distance from the boundary of the biometric region to the boundary of the biometric input image.

The input state estimating unit 17 then receives information representing the position of each singular point and the biometric region image from the feature quantity extracting unit 11.

The input state estimating unit 17, for example, examines whether the finger containing the fingerprint to be acquired as the biometric input information is displaced overly upward, downward, leftward, or rightward relative to the sensor face, or whether the finger is placed overly upright or overly tilted relative to the sensor face.

For example, if the centroid of the biometric region is located within a predetermined distance from the left edge of the biometric input image, the input state estimating unit 17 determines that the user's finger position is displaced overly rightward relative to the biometric information acquiring unit 3. There can also occur cases where the number of pixels contained in the biometric region and touching the left edge of the biometric input image is larger, by a number not smaller than a predetermined threshold value, than the number of pixels contained in the biometric region and touching the right edge of the biometric input image. In such cases also, the input state estimating unit 17 determines that the finger position is displaced overly rightward relative to the biometric information acquiring unit 3. On the other hand, if the centroid of the biometric region is located within a predetermined distance from the right edge of the biometric input image, the input state estimating unit 17 determines that the finger position is displaced overly leftward relative to the biometric information acquiring unit 3. There can also occur cases where the number of pixels contained in the biometric region and touching the right edge of the biometric input image is larger, by a number not smaller than a predetermined threshold value, than the number of pixels contained in the biometric region and touching the left edge of the biometric input image. In such cases also, the input state estimating unit 17 determines that the finger position is displaced overly leftward relative to the biometric information acquiring unit 3.

The predetermined distance here may be set, for example, equal to one half of the average width of the biometric region defined on the biometric input image when the finger is placed properly on the sensor face of the biometric information acquiring unit 3. On the other hand, the predetermined threshold value relating to the difference between the numbers of pixels touching the left and ridge edges, respectively, may be set, for example, equal to one third or one quarter of the vertical length of the biometric region defined on the biometric input image.

If the position of the user's body part is not displaced upward, downward, leftward, or rightward, but the area of the biometric region is smaller than a predetermined area threshold value, the input state estimating unit 17 determines that the finger position is a little too far apart from the sensor face of the biometric information acquiring unit 3. The predetermined area threshold value may be set, for example, equal to one half of the area of the biometric region defined on the biometric input image when the finger is placed properly on the sensor face of the biometric information acquiring unit 3.

There can also occur cases where the upward convex core corresponding to the center of the fingerprint fails to be detected from the biometric input information while the delta singular point has successfully been detected. In such cases, the input state estimating unit 17 determines that the finger is placed overly tilted relative to the sensor face of the biometric information acquiring unit 3 (that is, the fingertip end is not in contact with the sensor face while the joint part of the fingertip is in contact).

Further, based on the distance from the upward convex core to the lower edge of the biometric region and on the width of the biometric region, the input state estimating unit 17 can identify whether the finger is placed overly upright or displaced downward.

Figure 10A:
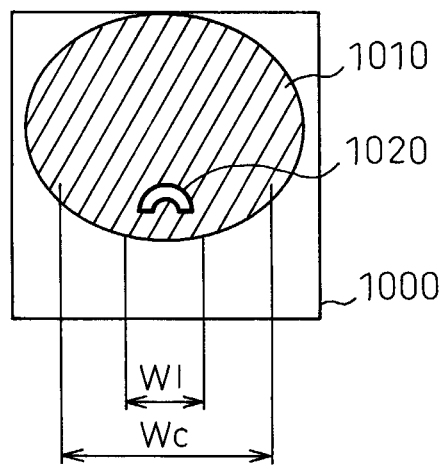
FIG. 10A is a schematic diagram of the biometric input image acquired when the finger is placed overly upright.
Figure 10B:
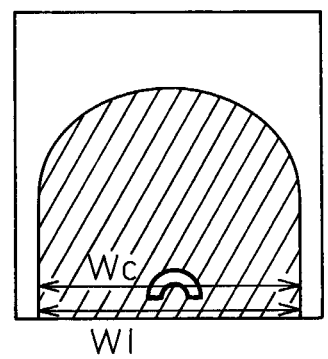
FIG. 10B is a schematic diagram of the biometric input image acquired when the finger is displaced downward.

FIG. 10A is a schematic diagram of the biometric input image acquired when the finger is placed overly upright (that is, the joint part of the fingertip is not in contact with the sensor face while the fingertip end is in contact), and FIG. 10B is a schematic diagram of the biometric input image acquired when the finger is displaced downward.

In FIGS. 10A and 10B, a rectangular region 400 indicates the biometric input image. A hatched region 1010 indicates the biometric region. An arc 1020 indicates the upward convex core.

As illustrated in FIG. 10A, if the biometric input image is acquired with the user's finger placed overly upright relative to the sensor face of the biometric information acquiring unit 3, the distance from the upward convex core 1020 to the lower edge of the biometric region 1010 becomes significantly short. Further, the horizontal width of the biometric region 1010 near the lower edge thereof is smaller than the horizontal width of the biometric region 1010 measured at the position of the upward convex core 1020.

On the other hand, if the finger is displaced downward relative to the sensor face of the biometric information acquiring unit 3, as illustrated in FIG. 10B, the distance from the upward convex core 1020 to the lower edge of the biometric region 1010 becomes significantly short, as in the above case. However, in this case, the horizontal width of the biometric region 1010 near the lower edge thereof is substantially equal to the horizontal width of the biometric region 1010 measured at the position of the upward convex core 1020.

In view of the above, the input state estimating unit 17 obtains the distance L from the upward convex core to the lower edge of the biometric region. The input state estimating unit 17 then compares the distance L with a predetermined threshold value T1. If the distance L is larger than the threshold value T1, the input state estimating unit 17 determines that the finger is neither placed overly upright nor displaced overly downward.

The predetermined threshold value T1 can be determined in the following manner by reference, for example, to the ridge spacing of the fingerprint.

$$T1 = N \times D$$

where N is an integer not smaller than 1. If the delta singular point or the downward convex core is located close to the upward convex core, the delta singular point or the downward convex core may also be detected even when the finger is placed overly upright. Therefore, when the delta singular point or the downward convex core is detected, the input state estimating unit 17 need not necessarily determine whether the finger is placed overly upright or not.

To determine the value of N, the number of ridges between the upward convex core and the delta singular point or the number of ridges between the upward convex core and the downward convex core may be calculated in advance from a plurality of fingerprints, and the value of N may be determined based on the statistics of the number of ridges. For example, the value of N may be determined by adding a standard deviation to the average number of ridges between the upward convex core and the delta singular point calculated from a plurality of fingerprints.

If the distance L is not larger than the threshold value T1, the input state estimating unit 17 measures the horizontal width Wc of the biometric region at the position of the upward convex core and the horizontal width W1 of the biometric region at the lower edge thereof. Then, if the width W1 is smaller than the width Wc multiplied by a given coefficient α whose value is smaller than 1, the input state estimating unit 17 determines that the finger is placed overly upright. The value of the coefficient α may be chosen to fall, for example, within the range of 0.5 to 0.8.

On the other hand, if the width W1 is not smaller than the width Wc multiplied by the coefficient α, the input state estimating unit 17 determines that the finger is displaced overly downward.

When the biometric information acquiring unit 3 is a sweep-type sensor, the input state estimating unit 17 may estimate the speed with which the user moves his body part including the biometric information, across the sensor or the direction in which the body part is moved. For example, if the vertical height of the biometric region is smaller than a predetermined threshold value, the input state estimating unit 17 may determine that the body part has been moved too fast across the sensor. Further, if the absolute difference between the center position of the horizontal width of the upper part of the biometric region and the center position of the horizontal width of the lower part of the biometric region, as measured in the horizontal direction, is larger than a predetermined threshold value, the input state estimating unit 17 determines that the body part has been moved in an overly skewed fashion across the sensor.

The input state estimating unit 17 passes input state information to the guidance processing unit 14 to indicate the estimated positioning of the body part that carries the biometric input information.

The guidance processing unit 14 selects from among the guidance messages stored in the storage unit 4 an appropriate one according to the input state information so that the user can be prompted to place his body part including the biometric information, properly on the sensor face of the biometric information acquiring unit 3.

For example, if the input state information indicates that the finger position is displaced overly leftward relative to the biometric information acquiring unit 3, the guidance processing unit 14 retrieves the guidance message appropriate to this type of positioning from the storage unit 4. The guidance message may be a message, such as "Please try again by repositioning your finger slightly rightward", that prompts the user to correct the cause that led to the incorrect acquisition of the biometric input image. On the other hand, if the input state information indicates that the finger is placed overly upright, the guidance processing unit 14 retrieves the guidance message appropriate to this type of positioning from the storage unit 4. The guidance message may be a message that says, for example, "Please try again by placing your finger horizontally on the sensor."

The guidance processing unit 14 displays the selected guidance message on the display unit 2.

As described above, when the classification result of the biometric input image is judged incorrect, i.e., when the acquired biometric input image is judged inappropriate to use for matching, the biometric information processing apparatus according to the second embodiment can notify the user of the method of correcting the cause that led to the incorrect acquisition of the biometric input image. Accordingly, the biometric information processing apparatus can prevent the occurrence of a situation in which the acquisition of the user's biometric information has to be repeated over and over again until the biometric input image suited to use for matching is acquired.

Next, a biometric information processing apparatus which carries out a biometric information authentication process according to a third embodiment will be described. The biometric information processing apparatus according to the third embodiment acquires a registered biometric image representing the registered biometric information of each registered user and, from the registered biometric image, creates data concerning the registered biometric information to be used for matching.

The biometric information processing apparatus according to the third embodiment is equipped with the input unit 6, depicted in FIG. 1, in order to acquire the user's identification information. In other respects, the biometric information processing apparatus according to the third embodiment is substantially the same as the biometric information processing apparatus according to the second embodiment, except for differences in some of the functions of the processing unit. Therefore, the functions of the processing unit in the biometric information processing apparatus according to the third embodiment will be described below by focusing on the differences from the functions of the processing unit in the biometric information processing apparatus according to the second embodiment.

Figure 11:
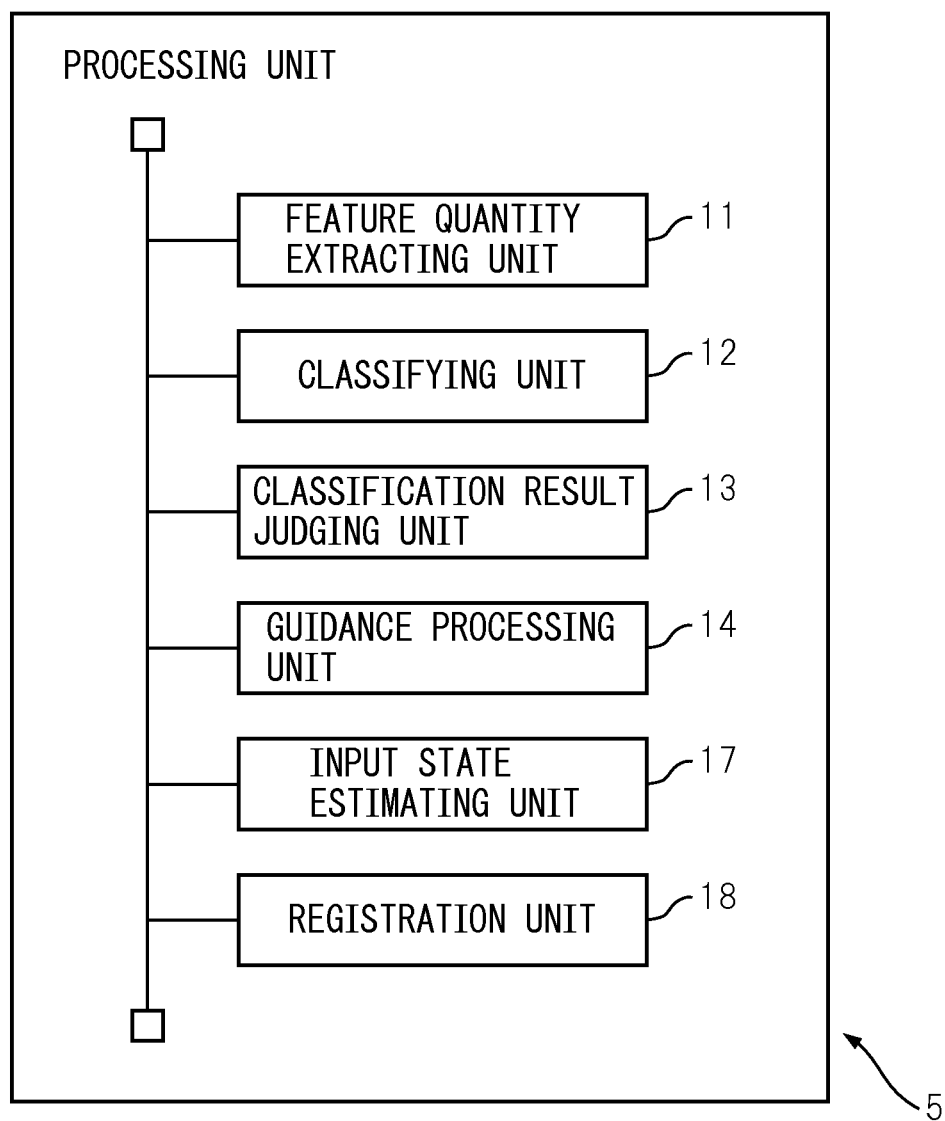
FIG. 11 is a functional block diagram of a processing unit incorporated in a biometric information processing apparatus according to a third embodiment, illustrating the functions to be implemented when registering user biometric information.

FIG. 11 is a functional block diagram of the processing unit incorporated in the biometric information processing apparatus according to the third embodiment. As illustrated in FIG. 11, the processing unit 5 includes a feature quantity extracting unit 11, a classifying unit 12, a classification result judging unit 13, a guidance processing unit 14, an input state estimating unit 17, and a registration unit 18. In FIG. 11, the functional blocks of the processing unit 5 corresponding to those of the processing unit 5 illustrated in FIG. 9 are respectively designated by the same reference numerals.

The registration unit 18 receives from the processing unit 5 the biometric input image that has been judged by the classification result judging unit 13 as being correctly classified. The registration unit 18 further receives from the processing unit 5 the identification information of the class having the highest confidence level among the classes into which the biometric input information represented by the biometric input image has been classified by the classifying unit 12. Then, the registration unit 18 takes the biometric input image judged as being correctly classified as the registered biometric image and the biometric information represented by that registered biometric image as the registered biometric information.

The registration unit 18 creates, from the registered biometric image, the data concerning the registered biometric information to be used for matching. The data concerning the registered biometric information may be, for example, the registered biometric image itself. Alternatively, the data concerning the registered biometric information may be the feature quantities extracted for matching purposes from the registered biometric image itself or from a sub-region thereof. If the data concerning the registered biometric information are the feature quantities to be used for matching, the registration unit 18 extracts the feature quantities for matching purposes from the registered biometric image itself or from a sub-region thereof, for example, in a manner similar to the matching unit 15 in the biometric information processing apparatus 1 according to the first embodiment.

Further, the registration unit 18 acquires the identification information of the registered user via the input unit 6. Then, the registration unit 18 stores the data concerning the registered biometric information in the storage unit 4 by associating the data with the identification information of the registered user. The registration unit 18 also stores the data concerning the registered biometric information in the storage unit 4 by associating the data with the identification information of the class into which the registered biometric information has been classified.

Figure 12:
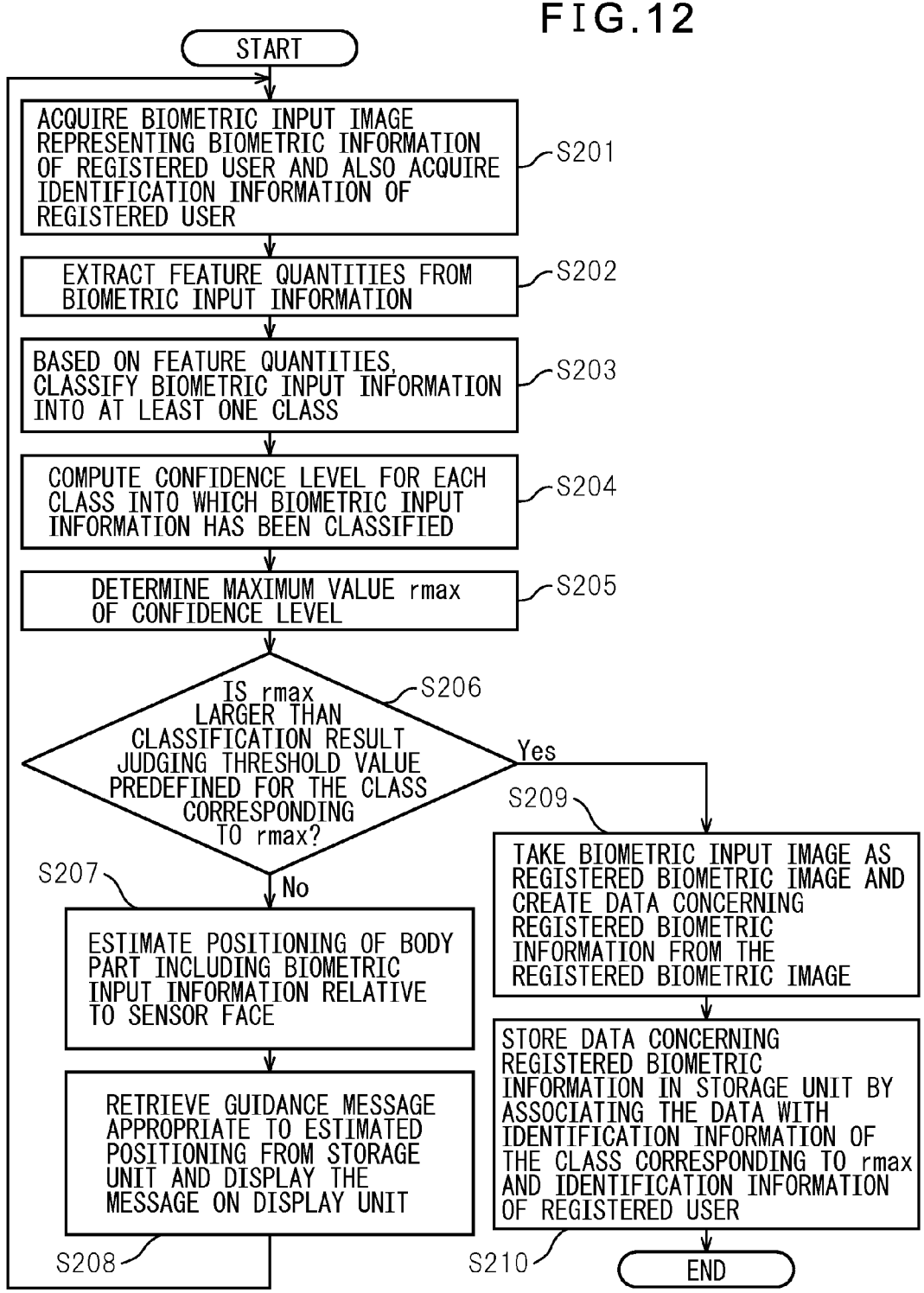
FIG. 12 is an operation flowchart of a biometric information registration process which is performed under the control of a computer program executed on the processing unit.

FIG. 12 is an operation flowchart of the biometric information registration process which is performed under the control of a computer program executed on the processing unit 5.

The processing unit 5 acquires a biometric input image representing the biometric information of the registered user via the biometric information acquiring unit 3 (step S201). The processing unit 5 also acquires the identification information of the registered user from the input unit 6. The processing unit 5 passes the biometric input image to the feature quantity extracting unit 11 in the processing unit 5.

The feature quantity extracting unit 11 extracts from the biometric input information the feature quantities based on which the biometric input image is classified into one of the plurality of classes categorized according to the common features of the biometric information (step S202). The feature quantity extracting unit 11 passes the extracted feature quantities to the classifying unit 12 in the processing unit 5.

The classifying unit 12 classifies the biometric input information into at least one of the classes based on the feature quantities (step S203). The classifying unit 12 computes the confidence level for each class into which the biometric input information has been classified (step S204). The classifying unit 12 passes the identification information of the class into which the biometric input information has been classified and the confidence level computed for that class to the classification result judging unit 13.

The classification result judging unit 13 that received the confidence level computed by the classifying unit 12 for each class into which the biometric input information has been classified determines the maximum value rmax of the confidence level (step S205).

The classification result judging unit 13 judges whether the maximum value rmax is larger than the classification result judging threshold value predefined for the class corresponding to that rmax (step S206).

If rmax is not larger than the classification result judging threshold value predefined for the class corresponding to that rmax (No in step S206), the classification result judging unit 13 judges that the classification result of the biometric input information is not correct. The classification result judging unit 13 then returns the result of the judgment to the processing unit 5. The processing unit 5 passes the biometric input image to the input state estimating unit 17 together with the feature quantities extracted by the feature quantity extracting unit 11.

The input state estimating unit 17 estimates the positioning of the body part including the biometric input information, relative to the sensor face of the biometric information acquiring unit 3 at the time of the acquisition of the biometric input image (step S207). The input state estimating unit 17 passes input state information to the guidance processing unit 14 to indicate the estimated positioning of the body part.

The guidance processing unit 14 that received the input state information retrieves from the storage unit 4 a guidance message that matches the estimated positioning contained in the input state information. The guidance processing unit 14 displays the guidance message on the display unit 2 (step S208). After that, the processing unit 5 acquires via the biometric information acquiring unit 3 a biometric input image re-acquired by rereading the user's body part. Then, the processing unit 5 returns to step S201 to repeat the above process.

On the other hand, if rmax is larger than the classification result judging threshold value predefined for the class corresponding to that rmax (Yes in step S206), the classification result judging unit 13 judges that the biometric input information has been correctly classified into the class corresponding to the rmax. Then, the classification result judging unit 13 returns the result of the judgment to the processing unit 5 together with the identification information of the class corresponding to the rmax.

The processing unit 5 passes the biometric input image representing the biometric input information and the identification information of the class corresponding to the rmax to the registration unit 18 together with the registered user's identification information acquired via the input unit 6.

The registration unit 18 takes the biometric input image as the registered biometric image. The registration unit 18 creates the data concerning the registered biometric information from the registered biometric image (step S209). Then, the registration unit 18 stores the data concerning the registered biometric information in the storage unit 4 by associating the data with the identification information of the registered user and the identification information of the class corresponding to the rmax, i.e., the class into which the registered biometric information has been classified (step S210).

After step S210, the processing unit 5 terminates the biometric information registration process.

The processing unit 5 may execute the steps S203 and S204 concurrently.

As so far described above, when registering the biometric information of the registered user, the biometric information processing apparatus according to the third embodiment can acquire biometric information suited to use for matching, while preventing unnecessary reacquisition of the biometric information and thus preventing the processing time from increasing.

The present invention is not limited to the above specific embodiments. For example, in an alternative embodiment, the processing unit of the biometric information processing apparatus may include the function of the registration unit depicted in FIG. 11 in addition to the functions depicted in FIG. 3 or 9. In that case, the biometric information processing apparatus can perform the biometric authentication by using the biometric information preregistered for matching purposes.

In another alternative embodiment, for each class into which the biometric input information has been classified, the classification result judging unit may compare the confidence level with its corresponding classification result judging threshold value. If there is more than one class whose confidence level has been judged to be higher than the classification result judging threshold value, the matching unit may compare the biometric input information with the registered biometric information belonging to one of the classes that have been judged to have a confidence level higher than the classification result judging threshold value. Alternatively, if there is more than one class whose confidence level has been judged to be higher than the classification result judging threshold value, the registration unit may register the biometric information so that the registered biometric information belongs to any of the classes that have been judged to have a confidence level higher than the classification result judging threshold value. That is, the registration unit may store the data concerning the registered biometric information in the storage unit by associating the data with the identification information of each of the classes that have been judged to have a confidence level higher than the classification result judging threshold value. In this way, for any user whose biometric information is not readily classifiable into one particular class, the biometric information of the user is registered in a plurality of classes in which the biometric information is readily classifiable. The biometric information processing apparatus can thus prevent the occurrence of a binning error even when the biometric information of the user is not readily classifiable into one particular class.

The biometric information processing apparatus and the biometric information processing method disclosed in this specification are applicable to various kinds of apparatus or systems that perform biometric authentication between user biometric information and preregistered biometric information in order to permit the user to perform a desired operation. Such apparatus or systems include, for example, a computer system in which one or more terminals are connected to a server via a communication network. In this case, each terminal is equipped with a biometric information acquiring unit, and the biometric image acquired by the biometric information acquiring unit is transmitted to the server. Then, the server carries out the biometric image registration or biometric authentication process by implementing the functions of the processing unit according to any one of the above embodiments.

Of the various functions incorporated in the processing unit according to each of the above embodiments, the processor in each terminal may implement the functions of the feature quantity extracting unit, the classifying unit, the classification result judging unit, the guidance processing unit, and the input state estimating unit, respectively, and the processor in the server may implement the other functions. This serves to alleviate the processing load on the server processor.

Further, a processing unit of a portable memory device, into which a biometric information acquiring unit, storage unit, processing unit, and a data transfer interface conforming to a standard such as Universal Serial Bus are integrated, may be configured to implement the various functions of the processing unit of the computer according to each of the above embodiments.

Further, the computer program that executes instructions for causing the computer to implement the functions of the processing unit according to each of the above embodiments may be provided in the form of a recording medium.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A biometric information processing apparatus comprising:
 a biometric information acquiring unit which acquires biometric input data representing a user's biometric information; and
 a processing unit, wherein the processing unit implements:
 a feature quantity extracting function which extracts a feature quantity characterizing a feature of the biometric information from the biometric input information represented by the biometric input data;
 a classifying function which classifies, based on the feature quantity, the biometric input information represented by the biometric input data into at least one of a plurality of classes categorized according to common features of biometric information, and which computes a confidence level for each class into which the biometric input information has been classified;
 a classification result judging function which judges whether or not a maximum value of the confidence level is larger than a threshold value predefined for the class corresponding to the maximum value among the plurality of classes; and a guidance function which, if the maximum value is not larger than the threshold value, prompts the user to have the user's biometric information reacquired by the biometric information acquiring unit.

2. The biometric information processing apparatus according to claim 1, wherein when the feature quantity contained in biometric information belonging to a first class of the plurality of classes is not contained in biometric information belonging to a second class of the plurality of classes, but the feature quantity contained in the biometric information belonging to the second class is contained in the biometric information belonging to the first class, the threshold value for the first class is set lower than the threshold value for the second class.

3. The biometric information processing apparatus according to claim 1, wherein the classifying function sets the confidence level lower as the number of classes into which the biometric input information has been classified increases.

4. The biometric information processing apparatus according to claim 1, wherein the biometric input data is an image that represents the biometric input information, and the processing unit further implements:

an input state estimating function which, if the maximum value is not larger than the threshold value, estimates the positioning of the user's body part including the biometric information relative to the biometric information acquiring unit at the time of the acquisition of the biometric input data, based on a positional relationship between a singular point extracted as the feature quantity from the biometric input information and a region defined on the image as containing the biometric input information, and wherein the guidance function presents a message appropriate to the estimated positioning to the user.

5. The biometric information processing apparatus according to claim 1, further comprising a storage unit which stores data concerning registered biometric information for at least one preregistered user together with identification information that identifies, among the plurality of classes, the class to which the registered biometric information belongs, and wherein the processing unit further implements:

a matching processing function which, if the maximum value is larger than the threshold value, retrieves the data concerning the registered biometric information belonging to the class into which the biometric input information represented by the biometric input data has been classified from among the data concerning the registered biometric information stored in the storage unit, and which compares the biometric input information with the registered biometric information represented by the retrieved data.

6. The biometric information processing apparatus according to claim 1, further comprising a storage unit, and wherein the processing unit further implements:

a registration function which, if the maximum value is larger than the threshold value, creates from the biometric input data the data concerning the registered biometric information to be used for matching, and which writes the data concerning the registered biometric information into the storage unit together with identification information that identifies the class into which the biometric input information represented by the biometric input data has been classified.

7. A biometric information processing method comprising:

acquiring biometric input data representing a user's biometric information;

extracting a feature quantity characterizing a feature of the biometric information from the biometric input information represented by the biometric input data;

classifying, based on the feature quantity, the biometric input information represented by the biometric input data into at least one of a plurality of classes categorized according to common features of biometric information, and computing a confidence level for the class into which the biometric input information has been classified;

judging whether or not a maximum value of the confidence level is larger than a threshold value predefined for the class corresponding to the maximum value among the plurality of classes; and if the maximum value is not larger than the threshold value, then prompting the user to have the user's biometric information reacquired by a biometric information acquiring unit.

8. A non-transitory computer-readable recording medium in which a computer program for a biometric information processing is recorded, the computer program for causing a computer to execute:

extracting, from a user's biometric information represented by biometric input data acquired by a biometric information acquiring unit, a feature quantity characterizing a feature of the biometric information;

classifying, based on the feature quantity, the biometric input information represented by the biometric input data into at least one of a plurality of classes categorized according to common features of biometric information, and computing a confidence level for the class into which the biometric input information has been classified;

judging whether or not a maximum value of the confidence level is larger than a threshold value predefined for the class corresponding to the maximum value among the plurality of classes; and if the maximum value is not larger than the threshold value, then prompting the user to have the user's biometric information reacquired by the biometric information acquiring unit.

* * * * *